United States Patent [19]

Okuyama et al.

[11] Patent Number: 5,467,402
[45] Date of Patent: Nov. 14, 1995

[54] DISTRIBUTED IMAGE RECOGNIZING SYSTEM AND TRAFFIC FLOW INSTRUMENTATION SYSTEM AND CRIME/DISASTER PREVENTING SYSTEM USING SUCH IMAGE RECOGNIZING SYSTEM

[75] Inventors: Yoshiyuki Okuyama; Tadaaki Kitamura; Yoshiki Kobayashi; Masakazu Yahiro; Kazunori Fujiwara, all of Hitachi, Japan

[73] Assignee: Hitachi, Ltd., Tokyo, Japan

[21] Appl. No.: 212,378

[22] Filed: Mar. 14, 1994

Related U.S. Application Data

[63] Continuation of Ser. No. 769,772, Oct. 2, 1991, abandoned, which is a continuation of Ser. No. 408,215, Sep. 18, 1989, abandoned.

[30] Foreign Application Priority Data

Sep. 20, 1988 [JP] Japan .................. 63-233422

[51] Int. Cl.⁶ .................. G06K 9/00
[52] U.S. Cl. .................. 382/104; 348/161; 382/203; 382/307
[58] Field of Search .................. 382/1, 4, 7, 56, 382/104, 141, 181, 305, 307, 203; 340/829.07, 829.09, 937; 235/379; 348/161

[56] References Cited

U.S. PATENT DOCUMENTS

| | | | |
|---|---|---|---|
| 3,685,012 | 8/1972 | Case et al. | 340/937 |
| 3,806,871 | 4/1974 | Shepard | 382/56 |
| 4,511,886 | 4/1985 | Rodriguez | 358/108 |
| 4,577,344 | 3/1986 | Warren et al. | 382/1 |
| 4,776,020 | 10/1988 | Kosaka et al. | 382/1 |
| 4,805,223 | 2/1989 | Denyer | 382/4 |
| 4,916,435 | 4/1990 | Fuller | 382/4 |
| 4,933,976 | 6/1990 | Fishbine et al. | 382/4 |

FOREIGN PATENT DOCUMENTS

| | | |
|---|---|---|
| 56-016289 | 5/1981 | Japan . |
| 61-157091 | 10/1986 | Japan . |
| 62-229477 | 7/1987 | Japan . |

OTHER PUBLICATIONS

English language Abstract of JP-A-61-157091.
English language Abstract of JP-A-62-229477.
Ihara, H. et al., "Autonomous Distribution System for Railway Traffic Control", Hitachi Hyoron vol. 63, No. 11, 1981, pp. 49–54.

*Primary Examiner*—Leo H. Boudreau
*Assistant Examiner*—Chris Kelley
*Attorney, Agent, or Firm*—Kenyon & Kenyon

[57] ABSTRACT

A plurality of image recognizing systems which are distributed and arranged and a centralized control apparatus are mutually connected via transmission lines. Each of the image recognizing apparatuses executes a predetermined image process to the image which is input from the ITV camera and transmits the processed image to the centralized control apparatus. The centralized control apparatus forms tuning parameters which are necessary for the instrumentation control by each image recognizing system from the transmitted processed image and transmits the tuning parameters to each image recognizing system. After the tuning parameters are received, each image recognizing system executes the measuring process. Therefore, for a plurality of image recognizing systems which are distributed at remote locations, the instrumentation control of each image recognizing system can be executed by the centralized control apparatus from one position.

5 Claims, 17 Drawing Sheets

FIG. 7
(a) INPUT IMAGE F (OFF-LINE)
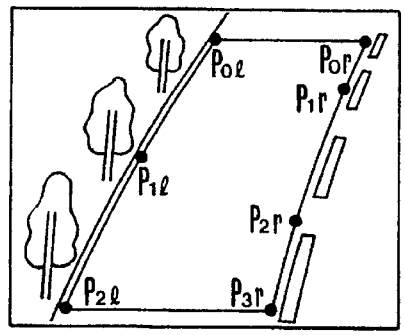
(b)
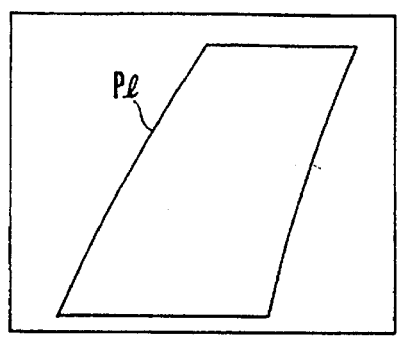
(c) INPUT IMAGE F (ON-LINE)
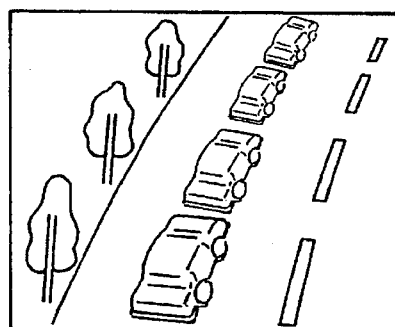
(d) MEASURING AREA IMAGE G
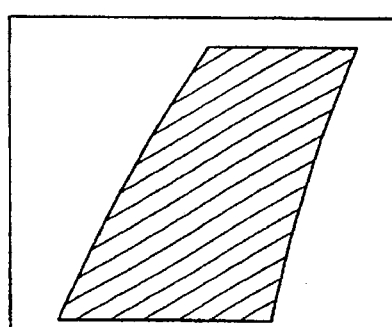
MASK
(e) IMAGE TO BE MEASURED
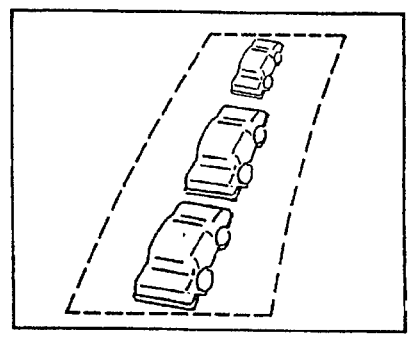

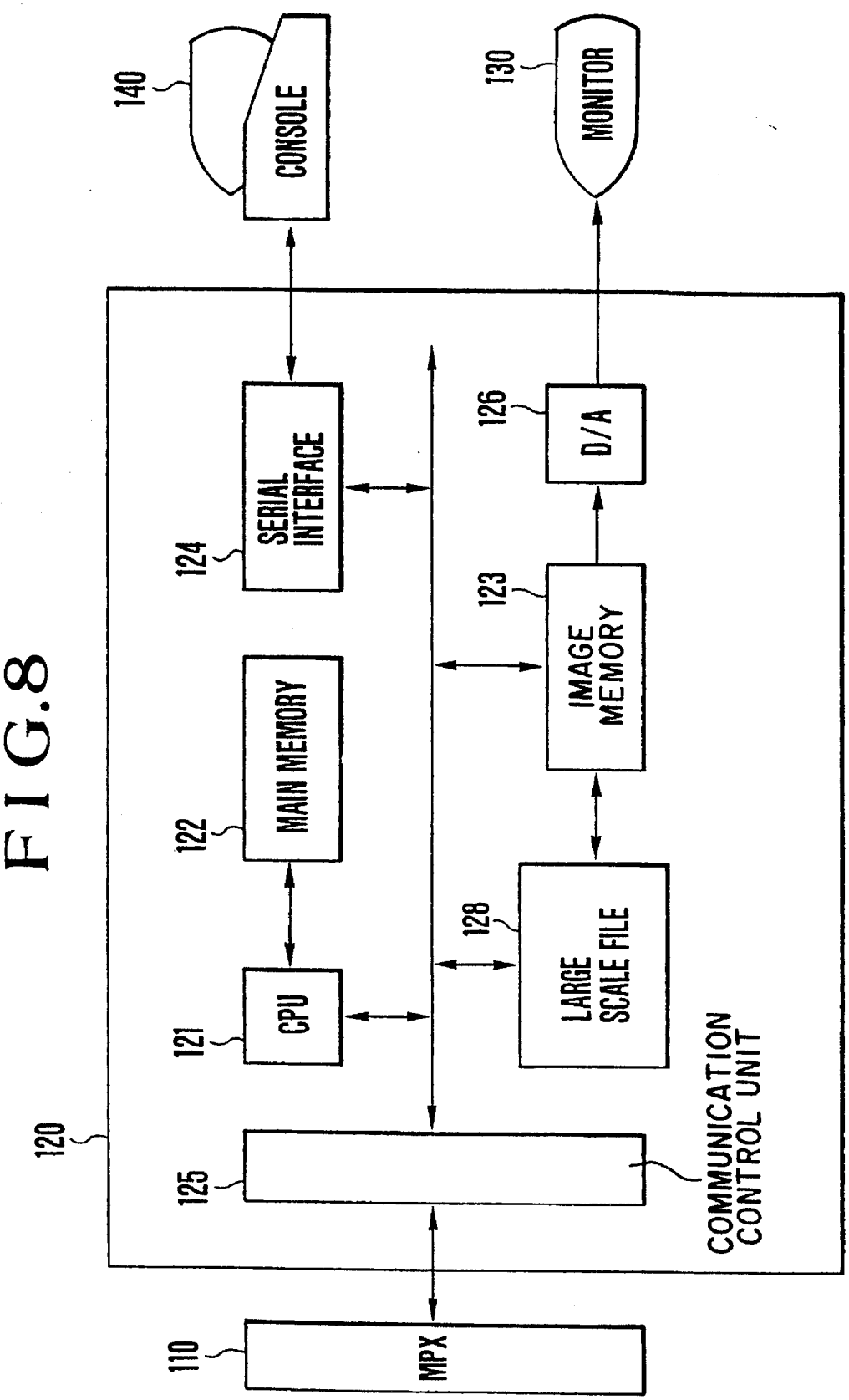

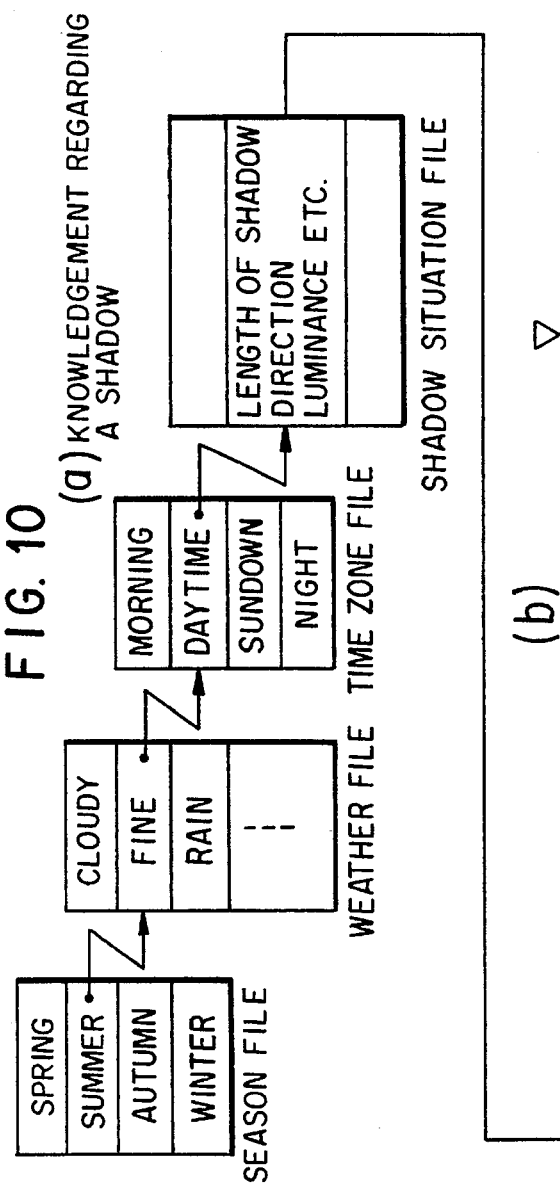
FIG. 10
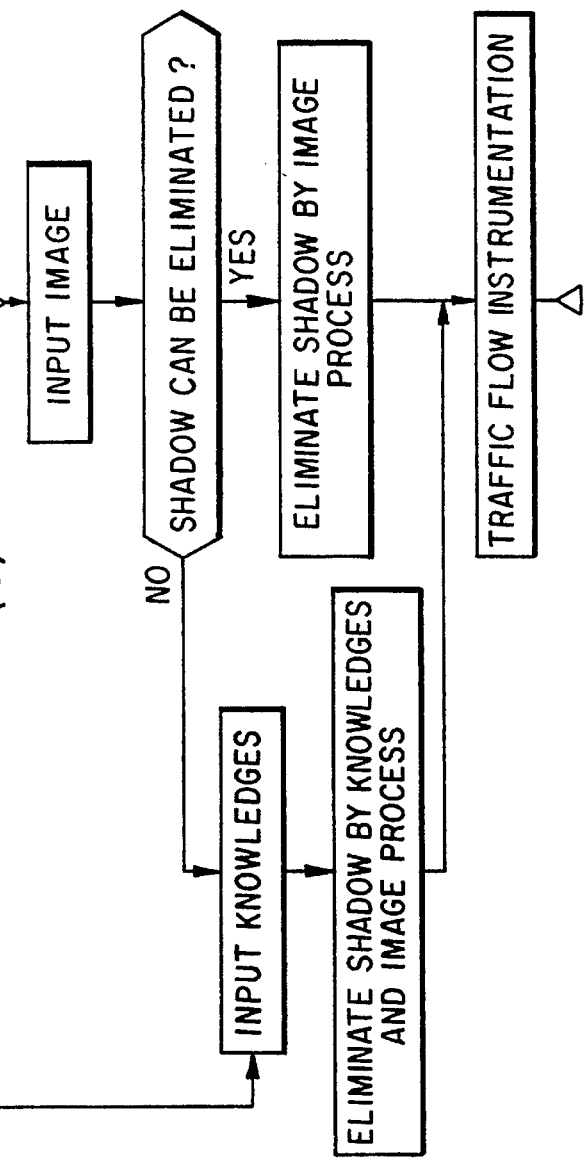
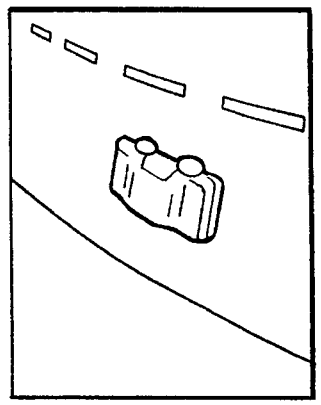
FIG. 9

FIG.17
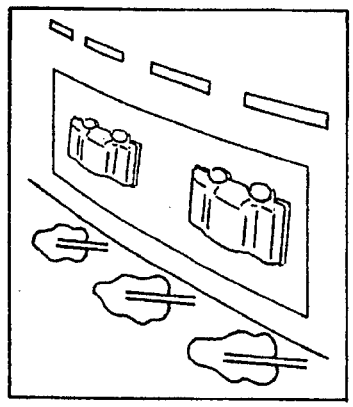
(a) ORIGINAL IMAGE
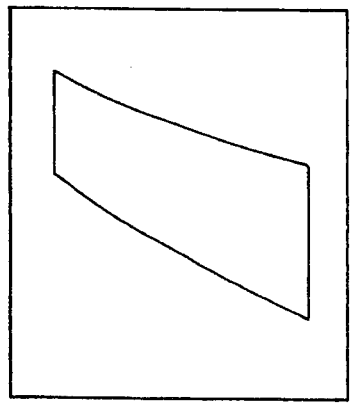
(b) MEASURING ALEA IMAGE
+
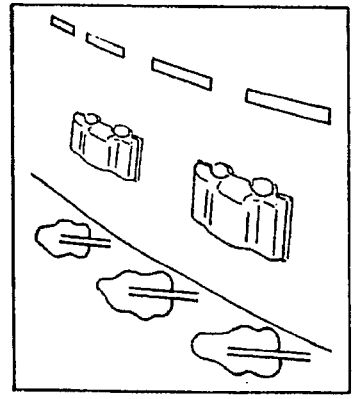
(c) MULTIPLEXED IMAGE (NORMAL)
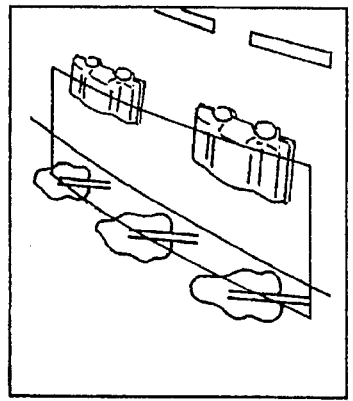
(d) MULTIPLEXED IMAGE (DEVIATED)

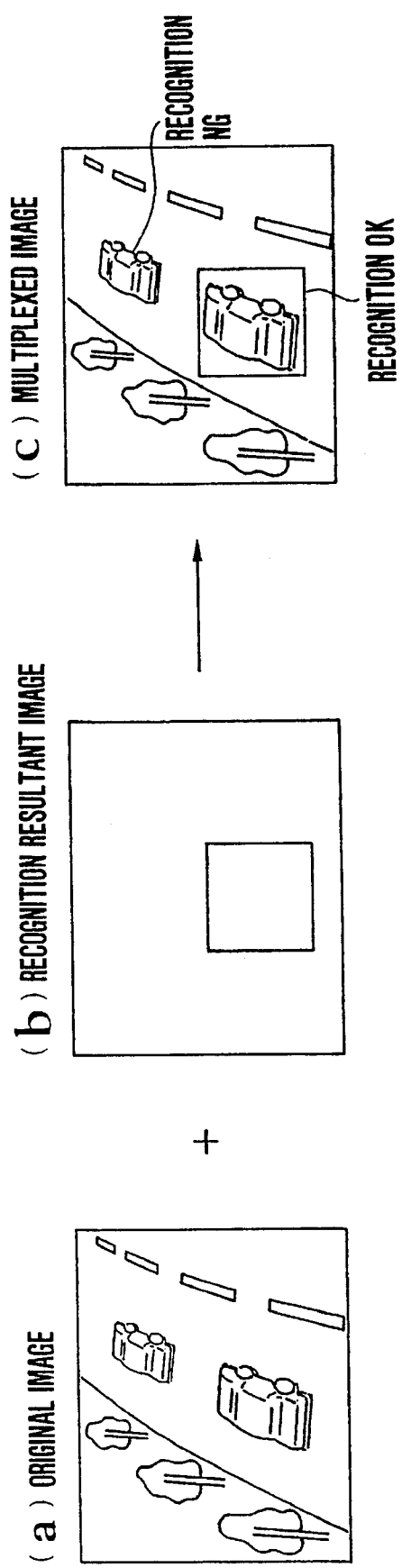

DISTRIBUTED IMAGE RECOGNIZING SYSTEM AND TRAFFIC FLOW INSTRUMENTATION SYSTEM AND CRIME/DISASTER PREVENTING SYSTEM USING SUCH IMAGE RECOGNIZING SYSTEM

This application is a continuation of U.S. patent application Ser. No. 07/769,772 filed on Oct. 2, 1991, now abandoned, which was a continuation of U.S. patent application Ser. No. 07/408,215 filed on Sep. 18, 1989, now abandoned.

BACKGROUND OF THE INVENTION

The present invention relates to a general industrial field such as a traffic control system, a crime prevention monitoring system, a large scale full automation (FA) system, and the like using an image recognizing technique and, more particularly, to a distributed image recognizing system which is suitable for integration of image recognizing systems which are distributed and arranged at remote locations.

In general, an image recognizing system recognizes an image which is picked up by a television camera (ITV) and outputs control data to a processing unit in accordance with an object on the basis of the result of the image recognition process. A conventional example of such a system is the "Hitachi General Image Recognizing Analyzing System HIDIC-IP Series" (disclosed in, "Hardware Manual", published on September, 1984).

When such a system is applied to an application field such that a plurality of measuring points (positions to be measured) are distributed, for instance, in a system for monitoring a traffic flow at a street intersection, as disclosed in the literature of, "Development of Image Processing Type Traffic Flow Instrumentation System at Street Intersection", Sumitomo Electric Industries, Vol. 130, pages 26 to 32, March, 1987, a plurality of fetching ports of ITVs are provided. Images from the plurality of ITVs are switched by a multiplexer or the like, and are processed by a single image recognizing system.

Such a system construction can be applied only when the measuring points are distributed over a narrow range. Such a system construction is not well suited when measuring points are distributed over a wide range, due to processing performance and operability. Therefore, in the fields where measuring points are distributed over a wide region, on the order of a few kilometers, such as i) traffic flow instrumentation system for spatially monitoring a flow of vehicles on a freeway, national road, or the like, ii) crime/disaster prevention monitoring system of factories, buildings, and the like which are distributed in each district, iii) large scale FA system for realizing integrated automatization of assembly, check, conveyance, and the like of products, and the like, an independent image recognizing system is assigned to each measuring point as shown in FIG. 2.

FIG. 2 is a diagram showing a state in which image recognizing systems 11, 21, and 31 are assigned to three measuring points A, B, and C, respectively.

Although the image recognizing systems 11, 21, and 31 are similarly constructed, since the instrumentation environments may differ at the respective measuring points, it may be necessary to individually tune the image recognizing systems.

The tuning processes are set for the measuring area, measuring conditions, object to be measured, and the like. The tuning processes may be executed by operators who are specifically allocated to each image recognizing system or a group of a few operators may go to all of the measuring points which are distributed to each district and execute the tuning processes.

In the above techniques, no consideration is paid to industrial field applications of the device where many measuring points are distributed at remote locations. The need for many operators and a long time are required to operate such image recognizing systems distributed through various districts are problems of the above techniques.

It is an object of the present invention to improve the operability of image recognizing systems which are distributed to respective districts and to reduce the number of operators and the operating time which are required for the operations.

SUMMARY OF THE INVENTION

The present invention has a plurality of image recognizing systems distributed and arranged and one new provided centralized control apparatus. The plurality of image recognizing systems and the centralized control apparatus are mutually connected by using transmission paths, thereby enabling at least image data to be transmitted and received between them. In each of the image recognizing systems, an image is input from an ITV camera is processed in accordance with a previously programmed procedure. The processed image is then transmitted to the centralized control apparatus. In the centralized control apparatus, tuning parameters which are necessary for instrumentation control of each image recognizing system are formed automatically from the transmitted processed image or on the basis of instructions or teachings of operators. The formed tuning parameters are again transmitted to the image recognizing systems via the transmission paths, and in each image recognizing system, the instrumentation is started after a tuning parameters transmitted from the centralized control apparatus are received.

Therefore, for a plurality of image recognizing systems which are distributed at remote locations, the instrumentation control of each image recognizing system can be executed from a single position by the centralized control apparatus, so that the number of operators and the operating time can be reduced.

BRIEF DESCRIPTION OF THE DRAWINGS

FIGS. 6 and 8 are block diagrams of data processing sections in second and third embodiments of the invention, respectively.

FIG. 7 is an operation explanatory diagram of the second embodiment of the invention.

FIGS. 9 and 10 are operation explanatory diagrams of the third embodiment of the invention.

FIGS. 17 and 18 are operation explanatory diagrams of the eighth embodiment of the invention.

DESCRIPTION OF THE PREFERRED EMBODIMENTS

Figure 1:
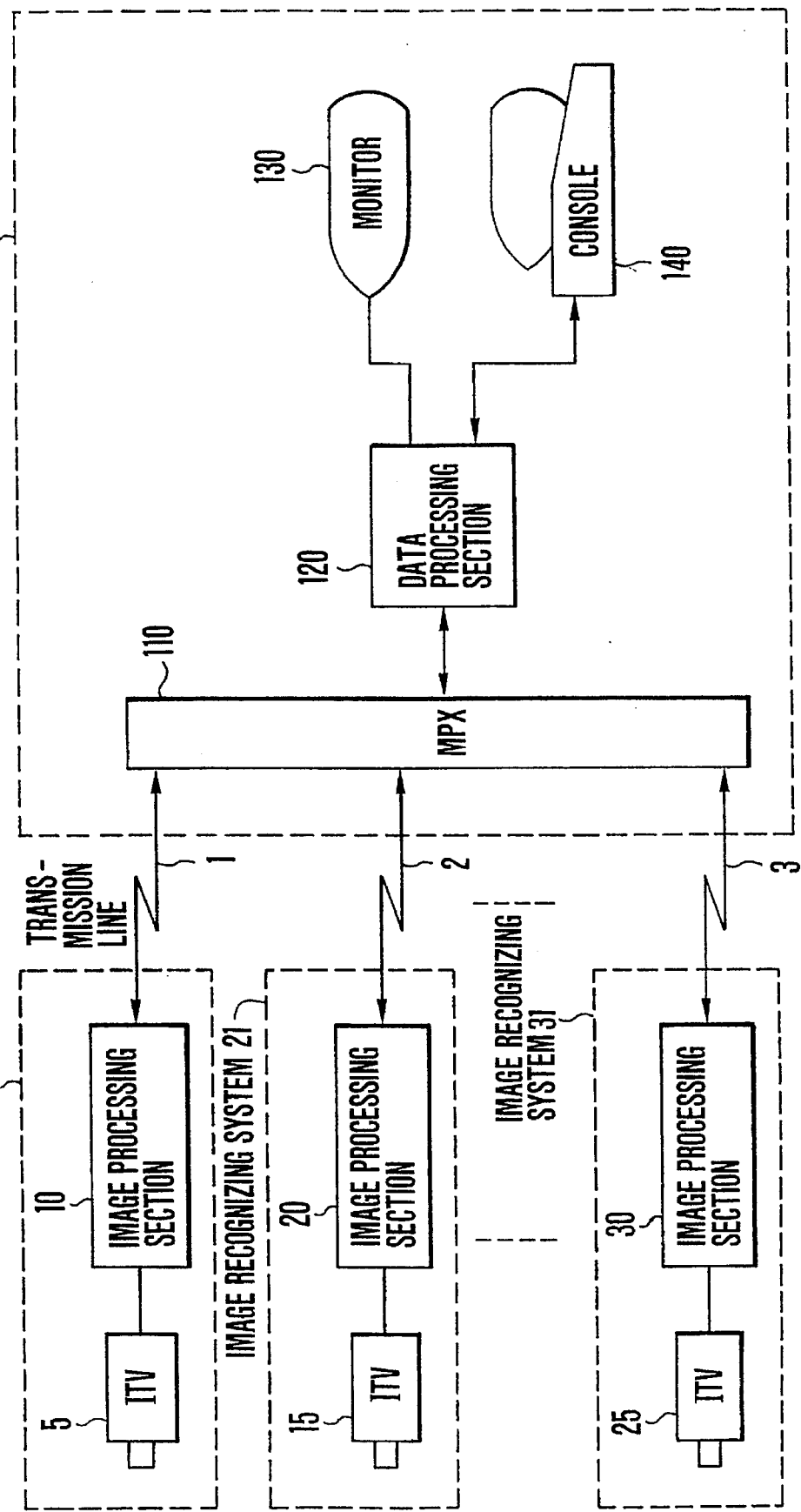
FIG. 1 is a fundamental constructional diagram of the present invention.
Figure 2:
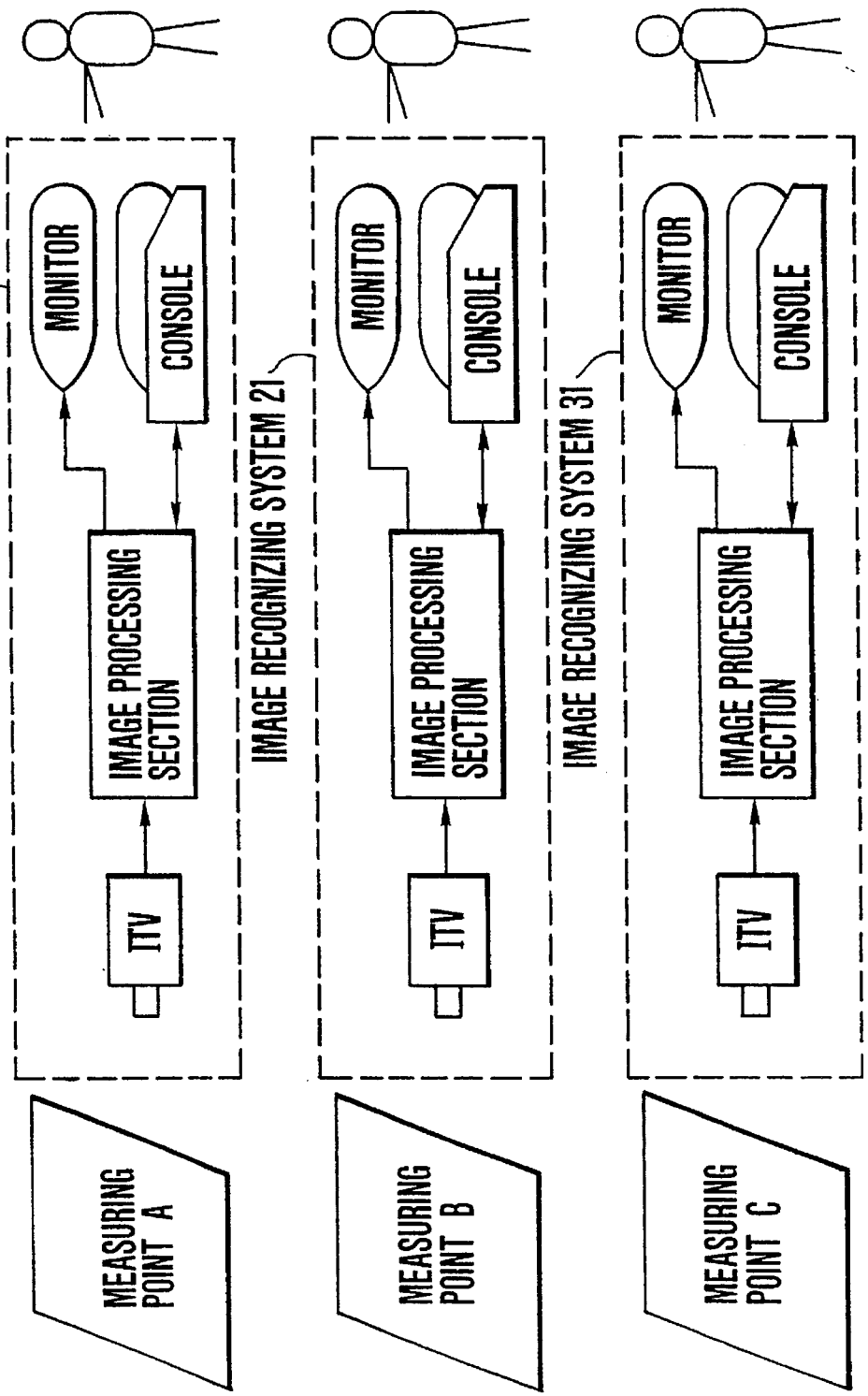
FIG. 2 is a constructional diagram of a conventional image processing system.

Embodiments of the present invention will be described hereinbelow.

(1) Embodiment 1

A first embodiment of the present invention will be described with reference to FIG. 1.

(a) Construction

The first embodiment comprises the following composing elements.

i) Image recognizing systems 11, 21, and 31 are provided such that one system is assigned to one measuring point. The image recognizing systems 11, 21, and 31 are constructed by ITV cameras 5, 15, and 25 for inputting images and image processing sections 10, 20, and 30 for processing the images which are input from the ITV cameras and executing various image instrumentations. The image recognizing systems 11, 21, and 31 have similar constructions and differ from the conventional techniques in that individual data input/output sections such as consoles, monitors, and the like for each system are eliminated and a monitor 130 and a console 140 which are provided in a centralized control apparatus 100, which will be explained below, are commonly used.

Each of the above image processing sections 10, 20, and 30 have a construction shown in FIG. 4 (the image processing sections 10, 20, and 30 have substantially the same construction and the image processing section 10 will now be described as an example) and will be explained in detail hereinbelow.

① An image processor 10-1 executes image arithmetic operations such as noise elimination, outline emphasis, and the like for the digitized image.

② An image memory 10-2 is a frame memory for arithmetically operating or processing the image which is input from the ITV camera by the image processor 10-1 and for storing the image (processed image) as the result of the arithmetic operation.

③ An A/D converter 10-3 converts an analog video signal as an output of the ITV camera 5 into a digital signal.

④ A CPU 4 is a control processor for executing the arithmetic operation control of the image processor 10-1 and executing the final image recognition, instrumentation processes, and the like on the basis of the results of the image processes obtained from the image processor 10-1.

⑤ A main memory 6 stores a recognition processing procedure of the CPU 4, tuning parameters, and the like.

⑥ An external interface 7 transmits the results of the image recognition and instrumentation process to an external processing control unit.

⑦ A digital input/output 8 executes input and output operations of data with the centralized control apparatus 100. The data includes the digitized image data, tuning parameters, and the like.

ii) The centralized control apparatus 100, generally illustrated in FIG. 1; concentratedly executes the instrumentation controls of the image recognizing systems 11, 21, and 31 which are distributed and arranged. The centralized control apparatus 100 comprises: a multiplexer (MPX) 110 for switching a plurality of transmission paths connected thereto; a data processing section 120 for executing communication and arithmetic operations of the image data and the like; a monitor 130 to display the image data; and a console 140 for inputting tuning data and the like and outputting the results of the instrumentations from the image recognizing systems 11, 21, and 31.

Figure 5:
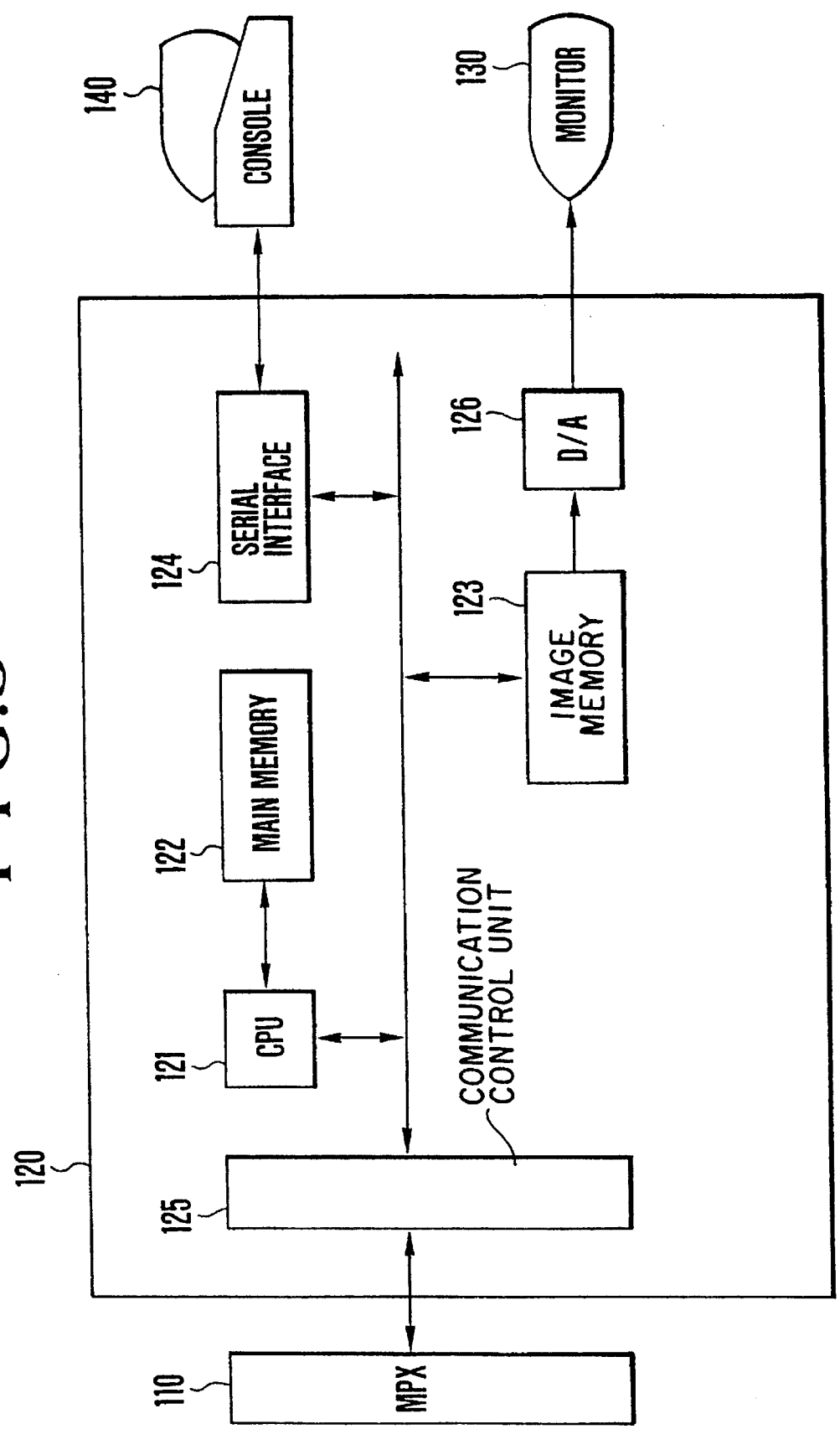
FIG. 5 is a block diagram of a data processing section serving as a fundamental constructional element of the invention.

The above data processing section 120 is shown in more detail in FIG. 5 and its details are as follows.

① A CPU 121 is a control processor for transmitting activation commands of the image recognizing systems 11, 21, and 31 and executing the formation and the like of the tuning parameters on the basis of the image data which are sent from the image recognizing systems 11, 21, and 31.

② A main memory 122 is a main memory of the CPU 121 and stores various processing procedures and the like.

③ An image memory 123 is a frame memory to temporarily store the image data sent from the image recognizing systems 11, 21, and 31.

④ A serial interface 124 controls data input/output with the console 140.

⑤ A communication control unit 125 controls communication of data such as image data, tuning parameters, and the like with the image recognizing systems 11, 21, and 31.

⑥ A D/A converter 126 is a digital/analog converter for displaying the images and the like stored in the image memory.

iii) Transmission lines 1, 2, and 3 of FIG. 1 are provided to execute data communication between the image recognizing systems 11, 21, and 31 which are arranged at remote positions and the centralized control apparatus 100. The transmission lines 1, 2, and 3 can mutually transmit large capacity data such as image data or the like between the image recognizing systems and the centralized control apparatus.

(b) Operation

Figure 3:
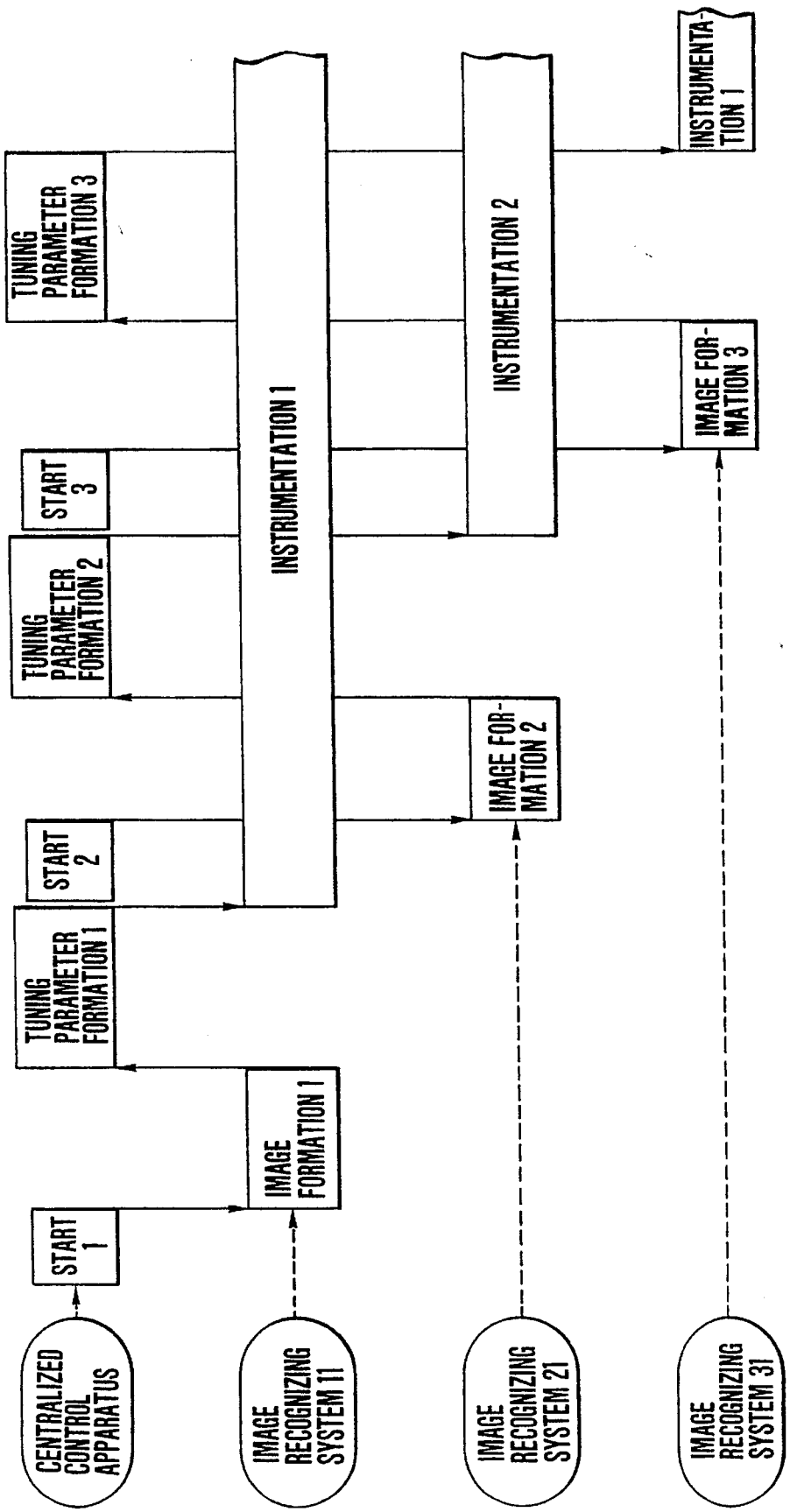
FIG. 3 is an operation explanatory diagram of the invention.

The operation of the first embodiment will be described with reference to FIG. 3.

First, the centralized control apparatus 100 transmits a start command to the image recognizing system 11 (start 1). The operator inputs the start command of the image recognizing system 11 from the console 140, so that the data processing section 120 analyzes the command and executes the private process of selecting the transmission line 1 with the MPX 110. At the same time, the start command is transmitted to the image recognizing system 11 via the transmission line 1.

After the start command is received from the centralized control apparatus 100, the image recognizing system 11 originally executes the following processes (image formation 1).

The image (original image) at the measuring point is fetched from the ITV camera 5 and processed by the image processing section 10 on the basis of a processing procedure which has previously been programmed for the original image. In this case, the image processing section executes an outline emphasis process for the original image, a process to eliminate unnecessary matters existing in the measuring area, and the like. The image (processed image) obtained here is transmitted to the centralized control apparatus 100 via the transmission line 1.

For the transmitted image, the centralized control apparatus 100 executes a process to display the image onto the monitor 130 and a process to form the tuning parameters (tuning parameter formation 1) in the data processing section 120. At this time, the operator can provide tuning parameters such as the optimum measuring area, the weather such as rain, fine, or the like, the presence or absence of the occurrence of a shadow, the direction, and the like from the console 140 while observing the image displayed on the monitor 130. The data processing section 120 can form more accurate tuning parameters on the basis of those instructions. The resultant tuning parameters are transmitted to the image recognizing system 11 through the transmission line 1.

When the tuning parameters are received, the image recognizing system 11 is tuned in accordance with the optimum instrumentation environmental conditions at the start of the instrumentation and, at the same time, the instrumentation is started (instrumentation 1).

After completion of the tuning parameter formation 1, the centralized control apparatus 100 transmits a start command to the image recognizing system 21 (start 2). Thereafter, processes are executed to all of the image recognizing systems in accordance with a procedure similar to the one described above.

If the instrumentation environmental conditions are similar, the tuning parameters which are formed on the basis of the processed image from the image recognizing system 11 can be also transmitted to, for instance, the image recognizing system 21.

(c) Effects

According to this embodiment, there are the following effects.

i) For a plurality of image recognizing systems which are distributed and arranged at remote locations, the tuning processes necessary for instrumentation control can be executed all together from the centralized control apparatus. The number of operators and the operating time can thus be reduced.

ii) When the tuning parameters are formed, the processes such as elimination of unnecessary information, emphasis of necessary information, and the like are executed to the original image by the image processing function of the image recognizing system, and thereafter, the tuning parameters are formed by using the resultant processed image. Thus, a burden which is required for the arithmetic operations of the centralized control apparatus can be reduced and, further, the operators are freed from troublesome operations (improvement of the operability).

(2) Embodiment 2

A second embodiment of the present invention will now be described. According to the second embodiment, in the off-line state (tuning process), the image transmitted from each image recognizing system is processed by the centralized control apparatus to thereby form a measuring area image (binary image in which an area to be measured is set to "1" and the other invalid area is set to "0") and the image is transmitted to the image recognizing system. In the on-line state (instrumentation process), the image recognizing system uses the measuring area image as a mask and limits the processing area of instrumentation for the input image from the ITV camera.

(a) Construction

Figure 6:
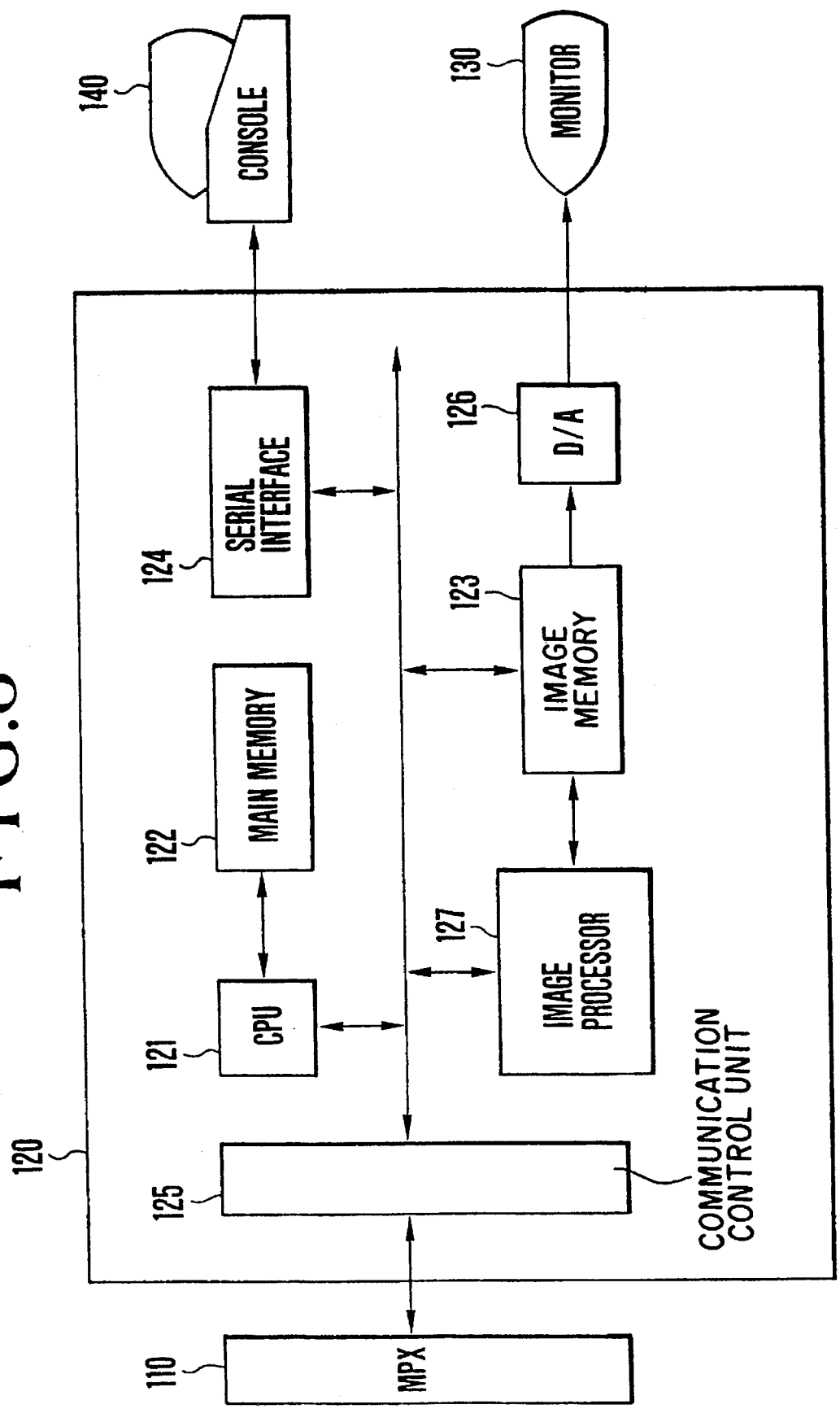

The second embodiment differs from the first embodiment in that an image processor 127 is newly provided as shown in FIG. 6 for the data processing section 120 (FIG. 5) of the centralized control apparatus 100 (FIG. 1).

The image processor 127 executes various image arithmetic operations for the image stored in the image memory 123 and forms the measuring area image.

(b) Operation

The fundamental operation of the second embodiment is similar to the first embodiment except for the following different points.

That is, in the off-line state, on the basis of the start command from the centralized control apparatus 100, the images sent from the image recognizing systems 11, 21, and 31 are temporarily stored into the image memory 123 of the data processing section 120 and, thereafter, the measuring area image is formed by the image processor 127 (FIG. 6). The above point will now be described hereinbelow with respect to a traffic flow instrumentation system as an example with reference to FIGS. 1, 4, 6, and 7.

The traffic flow instrumentation system measures traffic flow on a road (the number of vehicles which have passed, average velocity, spatial occupation ratio, etc.).

An image obtained by photographing a road is transmitted from the image recognizing system to the centralized control apparatus 100 and stored into the image memory 123 of the data processing section 120. At the same time, the image is also displayed by the monitor 130.

The operators observe the image displayed on the monitor 130 and indicate a measuring area necessary for traffic flow instrumentation to the system via the console 140.

For instance, as shown in FIG. 7(a), the measuring area is indicated by pointing a few points of an outline of the road surface to be measured. In the example, points $P_{0l}$, $P_{1l}$, $P_{2l}$, $P_{0r}$, $P_{1r}$, $P_{2r}$, and $P_{3r}$, are pointed. The above point train can be directly indicated to the system by inputting their coordinates from the console 140 or by pointing to them by using a pointing device such as a mouse or the like.

The image processor 127 interpolates the point train by, for instance, straight lines and makes a closed curve $P_l$ as an outline of the road surface as shown in FIG. 7(b). Further, the image processor 127 executes a process such that the inside area surrounded by the closed curve is set to 1 and the other areas are set to 0 (for instance, such a process can be realized by executing the labeling process to assign the same number to the coupling components and by setting the label assigned to the area in the $P_l$ to 1 and setting the other labels to 0 by the binarizing process), thereby making a measuring area image g as shown in FIG. 7(d). The measuring area image g formed is transmitted to the corresponding image recognizing system via the transmission line.

For instance, in the image recognizing system 11, the measuring area image g is stored as a binary image for masking into the image memory 10-2.

In the on-line, an image f (for instance, in FIG. 7(c)) which is input from the ITV 5 of the image recognizing system 11 and the measuring area image g stored in the image memory 10-2 are mask arithmetically operated by the image processor 10-1, so that an image to be measured as shown in FIG. 7(*e*) is obtained. In the processing system of the mask arithmetic operation, when the mask image g is set to "1", the input image f is directly output, and when the mask image g is set to "0", "0" is output. The above processes are executed on a pixel unit basis with respect to all of the picture planes.

The images to be measured obtained by the above processes include only the information on the road surface necessary for traffic flow instrumentation and the other unnecessary information (trees, center line) is eliminated.

The image recognizing system 11 executes the traffic flow instrumentation by using the images to be measured. The same shall also apply to the other image recognizing systems.

The above processes can be also applied to a distributed image recognizing system other than the traffic flow instrumentation system.

(c) Effects

In addition to the effects of the first embodiment, the second embodiment has the following new effects.

i) Since all of the measuring area images which need complicated arithmetic operations can be made all together by the centralized control apparatus, the burdens of the image recognizing systems distributed and arranged can be reduced. Since the arithmetic operating function of the image recognizing system can be reduced in association with a decrease in burden, a less expensive system can be constructed.

ii) Since unnecessary information can be eliminated from the image to be measured input from the ITV due to the measuring area image, the instrumentation accuracy can be improved.

iii) Since the area to be measured can be limited to a narrow range by the measuring area image, the processing time which is required for instrumentation can be reduced. (Realization of a high processing speed) is possible.

(3) Embodiment 3

A third embodiment of the present invention will be described below. According to the third embodiment, a large scale file is provided in the centralized control apparatus and knowledge which will be needed in the measuring processes by the image recognizing system is stored in the file. In the on-line instrumentation, the knowledge in the file is transmitted to the image recognizing system as necessary. The image recognizing system executes the measuring processes by using the stored knowledge.

(a) Construction

The third embodiment differs from the first embodiment in that, as shown in FIG. 8, a large scale file 128 is newly provided for the data processing section 120 (FIG. 5) provided in the centralized control apparatus 100 (FIG. 1).

The large scale file 128 stores the knowledge necessary in the measuring processes by the image recognizing system. The operator can register arbitrary knowledge into the file 128 from the console 140. The image recognizing system can refer to the knowledge registered in the file 128 as necessary.

(b) Operation

The fundamental operation of the third embodiment is similar to that of the first embodiment except for the following different points.

That is, in the off-line state, the operator registers the knowledge necessary for the measuring processes by the image recognizing systems 11, 21, and 31 into the large scale file 128 in the data processing section 120 shown in FIG. 8. In the on-line state, in response to requests from the image recognizing systems 11, 21, and 31, the knowledge stored in the large scale file is accessed and on the basis of the knowledge, the image recognizing systems 11, 21, and 31 execute the measuring processes.

The above point will now be described hereinbelow with respect to the traffic flow instrumentation system as an example in a manner similar to the second embodiment.

It is a technical subject of the traffic flow instrumentation system that vehicles are stably recognized from the image photographed by the ITV camera. However, as shown in FIG. 9, there is a case where a shadow generated around a vehicle causes an erroneous operation of the vehicle recognition. For instance, the shadow is regarded as a part of the vehicle. Therefore, an error may be caused in determination (discrimination among large, mid-size, and small vehicles) of the kind of vehicle or so that the moving distance of the vehicle might not be accurately detected or the vehicle velocity may be erroneously calculated, or the like. In view of the errors caused by shadows, it is necessary to eliminate the shadow of the vehicle. In general, the shadow of a white vehicle can be easily eliminated by an image processing method such as a binarizing process or the like because a luminance difference in the image clearly occurs between the shadow of the white vehicle and the body of the white vehicle (the luminance of the white vehicle is higher than the luminance of the road surface, while the luminance of the shadow of the vehicle is lower than the luminance of the road surface). However, it is difficult to discriminate the shadow of a black vehicle from the body of the black vehicle merely by the image process since both of the luminance of the black vehicle and the luminance of the shadow of the vehicle are lower than the luminance of the third road surface. To solve such a problem, in the off-line state, the third embodiment registers occurrence of the shadow as knowledge into the large scale file 128 in the centralized control apparatus 100. In the on-line state, if the image recognizing systems 11, 21, and 31 cannot eliminate the shadow, the shadow can be eliminated by using the knowledge stored in file 128 as necessary.

First, in the off-line state, the knowledge regarding the occurrence of the shadow registered in the large scale file 128 has a construction as shown in FIG. 10(*a*). Since the shadow's parameters, that is, a length, a direction, a luminance, and the like differ depending on the season, weather, and time zone (such as time of day), special files are provided for the respective conditions and construct a hierarchy list structure. FIG. 10(*a*) shows an example in a state of the shadow when the season is summer, the weather is fine, and the time zone is the daytime is registered as knowledge in a shadow situation file. The registered knowledge can be also read out from the large scale file 120 in accordance with the same order as mentioned above.

In the on-line state, for instance, the image recognizing system 11 executes the traffic flow instrumentation on the basis of a processing procedure in FIG. 10(*b*). A flow of the processing procedure is as follows.

i) An image is input by the ITV 5.

ii) The image processing section 10 discriminates whether the shadow can be eliminated from the image which has just been input or not. As a discriminating method, for instance, when the luminance of the region where a vehicle is expected to pass is lower than the luminance of the road surface and, at the same time, the area of the region is larger than a reference value, it is decided that the shadow cannot be eliminated (in the case of the shadow of a black vehicle), and in the other cases, it is determined that the shadow can be eliminated (in the case of the shadow of a white vehicle).

iii) If it is determined that the shadow can be eliminated in the above item ii), the shadow is eliminated by only the image processing function of the image processor 10-1 and the traffic flow instrumentation process is executed.

iv) If it is decided that the shadow cannot be eliminated in the item ii), the image processing section 10 generates a request to access the knowledge regarding the generation of the shadow to the centralized control apparatus 100 via the transmission line 1. In the centralized control apparatus 100, generation of the request from the image recognizing system 11 is analyzed by the data processing section 120 and, at the same time, the knowledge about the shadow is read out of the large scale file 128 in accordance with a procedure shown in FIG. 10(*a*). The knowledge is transmitted to the image recognizing system 11 through the transmission line 1.

v) The image processing section 10 of the image recognizing system 11 eliminates the shadow on the basis of the knowledge regarding the situation of the occurrence of the shadow in the item iv) by the image processing function of the image processor 10-1. Thereafter, the traffic flow instrumentation process is executed.

The above processing procedure relates to the operation of the third embodiment.

In the embodiment, the knowledge stored in the large scale file of the centralized control apparatus has been used as an occurrence of the shadow. However, the following other knowledge can be also considered.

① A history of the results of the past instrumentations obtained by each image recognizing system, and ② tuning parameters for the past instrumentation control for each image recognizing system, and the like.

On the other hand, this knowledge can be mixedly registered in the large scale file in accordance with the necessity of each image recognizing system.

(c) Effects

According to the third embodiment, in addition to the effects of the first embodiment, a higher advanced measuring processes can be realized by using both of the image processing function of the image recognizing system and the knowledge stored in the centralized control apparatus. This improves the instrumentation accuracy.

(4) Embodiment 4

A fourth embodiment of the present invention will be described below. According to the fourth embodiment, failures of distributed image and arranged recognition systems can be diagnosed from the centralized control apparatus.

(a) Construction

Figure 11:
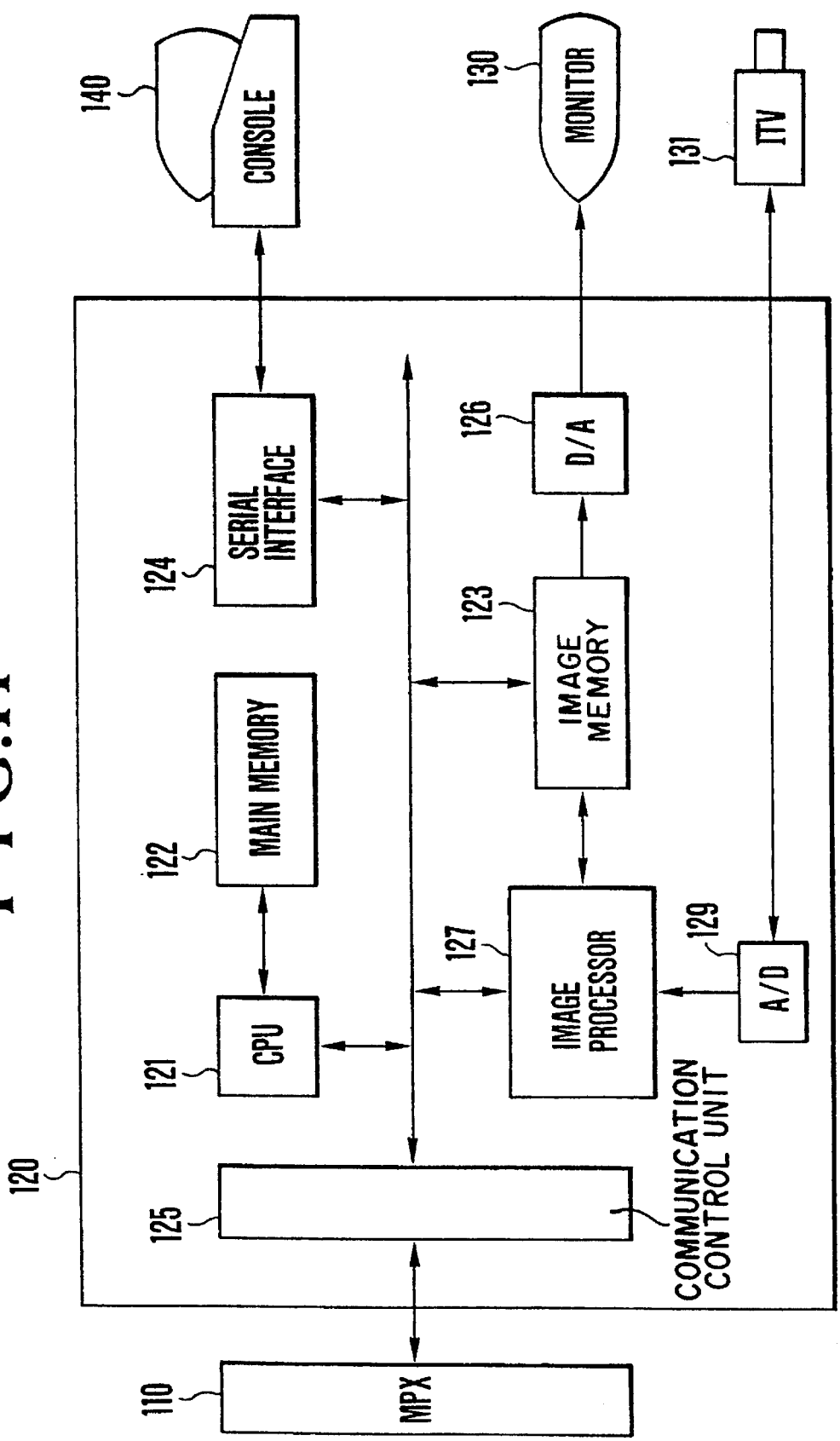
FIG. 11 is a block diagram of a data processing section in a fourth embodiment of the invention.

The embodiment 4 differs from the first embodiment as shown in FIG. 11. An image processor 127 and an A/D converter 129 are newly provided for the data processing section 120 (FIG. 5) provided in the centralized control apparatus 100 (FIG. 1). Additionally, an ITV, 131, is provided in connection with the data processing section 120.

Figure 4:
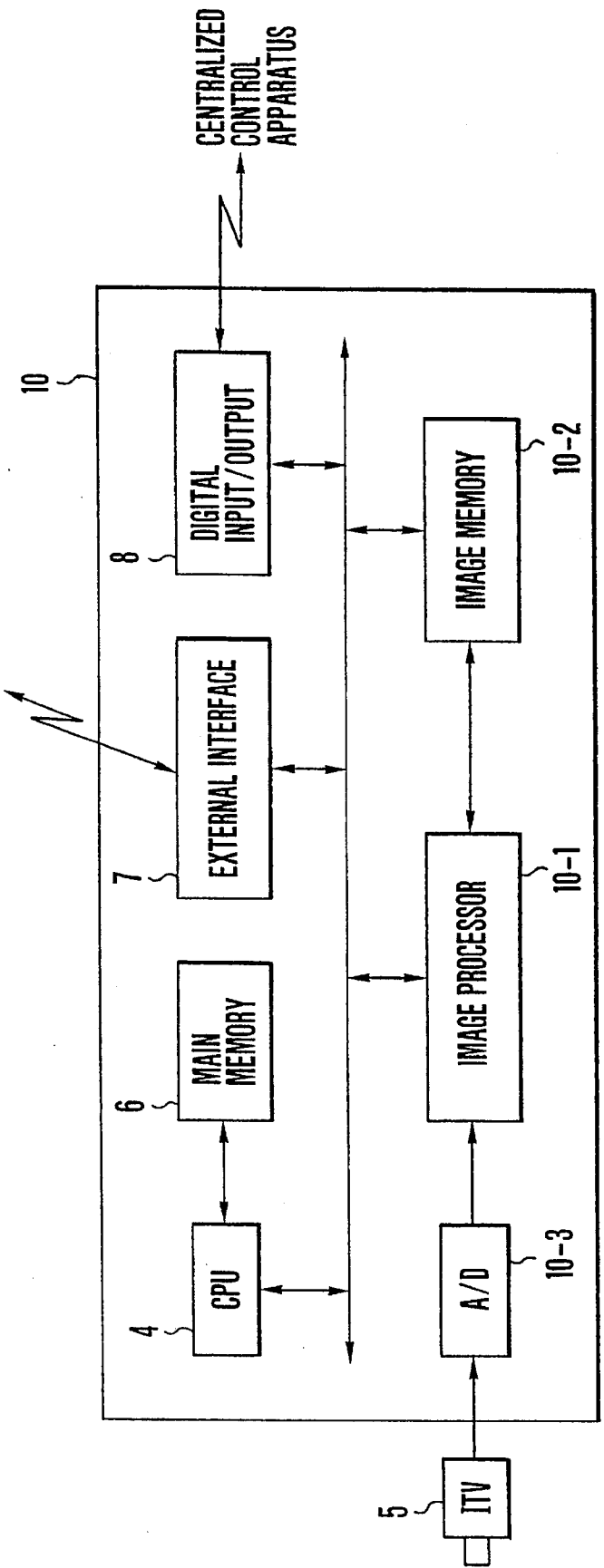
FIG. 4 is a block diagram of an image processing section serving as a fundamental constructional element of the invention.

The image processor 127 is the same as the image processor (the image processor 10-1 for the image processing section 10 in FIG. 4) provided in each of the image processing sections 10, 20, and 30 of the image recognizing systems 11, 21, and 31.

The ITV 131 inputs a test image for diagnosing a failure of the image recognizing system.

The A/D converter 129 converts the analog video signal which is input from an ITV 131 into the digital signal and sends the digital signal to the image processor 127.

(b) Operation

The fundamental operation in the measuring processes of the embodiment 4 is substantially the same as the first embodiment. In the fourth embodiment, a function such that failures of the distributed and arranged image recognizing systems 11, 21, and 31 can be diagnosed from the centralized control apparatus 100 is newly provided.

In the failure diagnosis of this embodiment, the operation of the image processing function of the image processing section provided in the image recognizing system correctly is checked.

Figure 12:
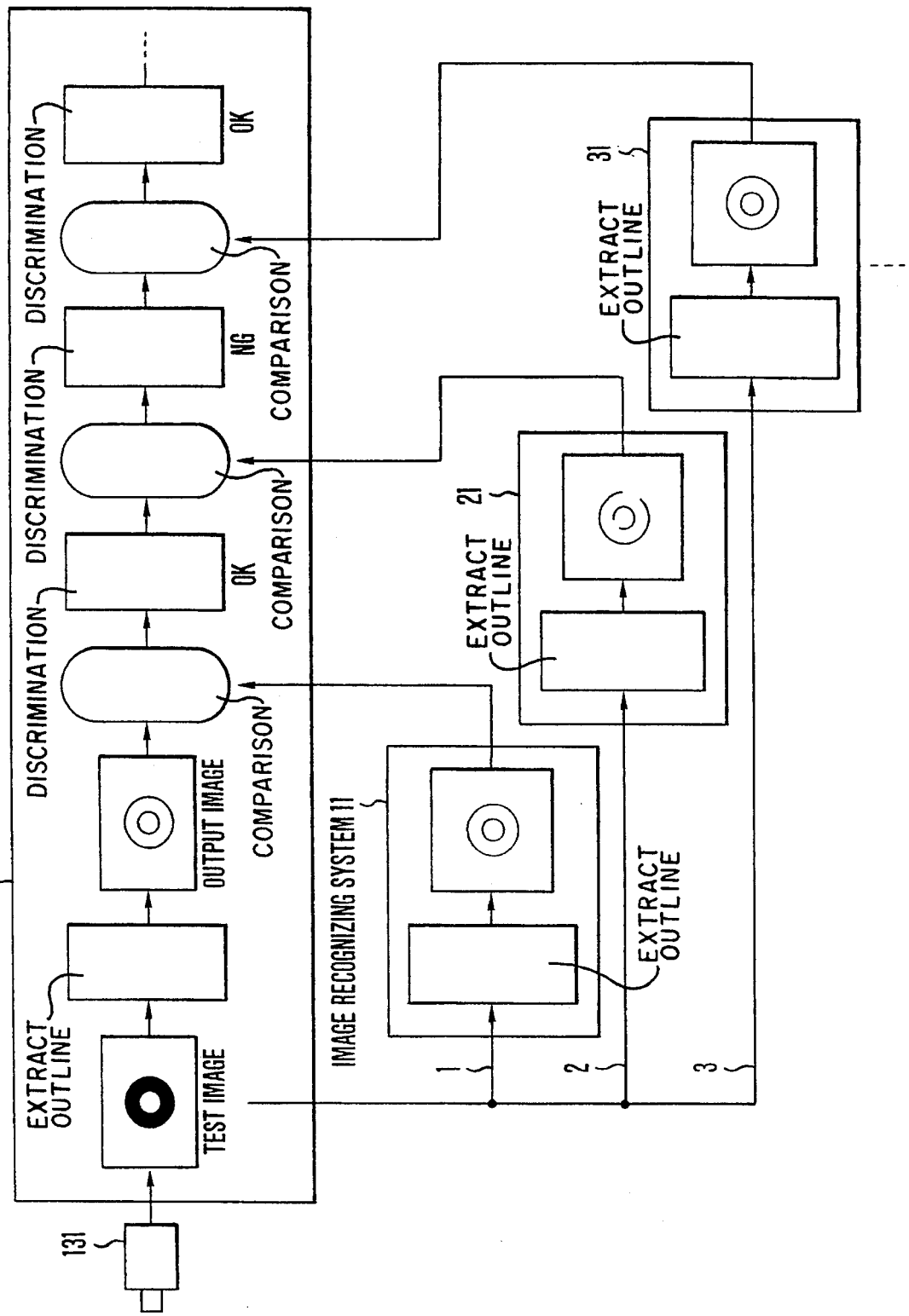
FIG. 12 is an operation explanatory diagram of the fourth embodiment of the invention.

The practical operation of the embodiment will now be described hereinbelow with reference to FIGS. 11 and 12.

i) The data processing section 120 of the centralized control apparatus 100 inputs a test image from the ITV 131. An image having a simple shape such that the results of the processes by the image processes can be clearly discriminated as shown in FIG. 12 is used as a test image. Commercially available test charts or the like can be also used.

ii) The image processor 127 of the data processing section 120 processes the test image and stores the result into the image memory 123. In the embodiment, as shown in FIG. 12, outline extraction as one of the image processing functions is executed by the image processor 127 and the resultant output image (outline image) is stored in the image memory 123.

iii) The test image obtained in the item i) is transmitted to the image recognizing systems 11, 21, and 31 in accordance with this order via the transmission lines 1, 2, and 3.

iv) First, in a manner similar to the process in the item ii), in the image recognizing system 11, the image processor 10-1 extracts the outline of the test image which has just been transmitted and stores the result (outline image) into the image memory 10-2.

v) The outline image in the item iv) is read out of the image memory 10-2 and is, further, transmitted to the image processor 127 of the data processing section 120 provided in the centralized control apparatus 100 via the transmission line 1.

vi) The image processor 127 compares the transmitted outline image with the outline images which have already been stored in the image memory 123 on a pixel unit basis and discriminates whether all of them coincide or not. If all of them coincide, the image processing section 10 of the image recognizing system 11 is determined to be operating in a normal manner. As shown in FIG. 12, the result of the discrimination is set to "OK". If they do not coincide, it is decided that the hardware of the image processing section 10 has failed, and the answer of the discrimination is set to NG.

vii) The processes in the items iv) to vi) are also similarly executed to the other image recognizing systems 21 and 31 and any failures therein are diagnosed.

The above processes relate to the operation of this embodiment.

In this embodiment, the outline extracting process has been used. However, failure diagnosis can be similarly executed by other image processing functions. If a plurality of image processing functions are simultaneously used, the detecting accuracy of the failure diagnosis can be further improved.

(c) Effects

In addition to the effects of the first embodiment, the fourth embodiment has an effect such that failures of the distributed and arranged image recognizing systems can be diagnosed from the centralized control apparatus. The maintenance efficiency is thus improved. (The time and the number of operators required for maintenance can be reduced.)

(5) Embodiment 5

Figure 13:
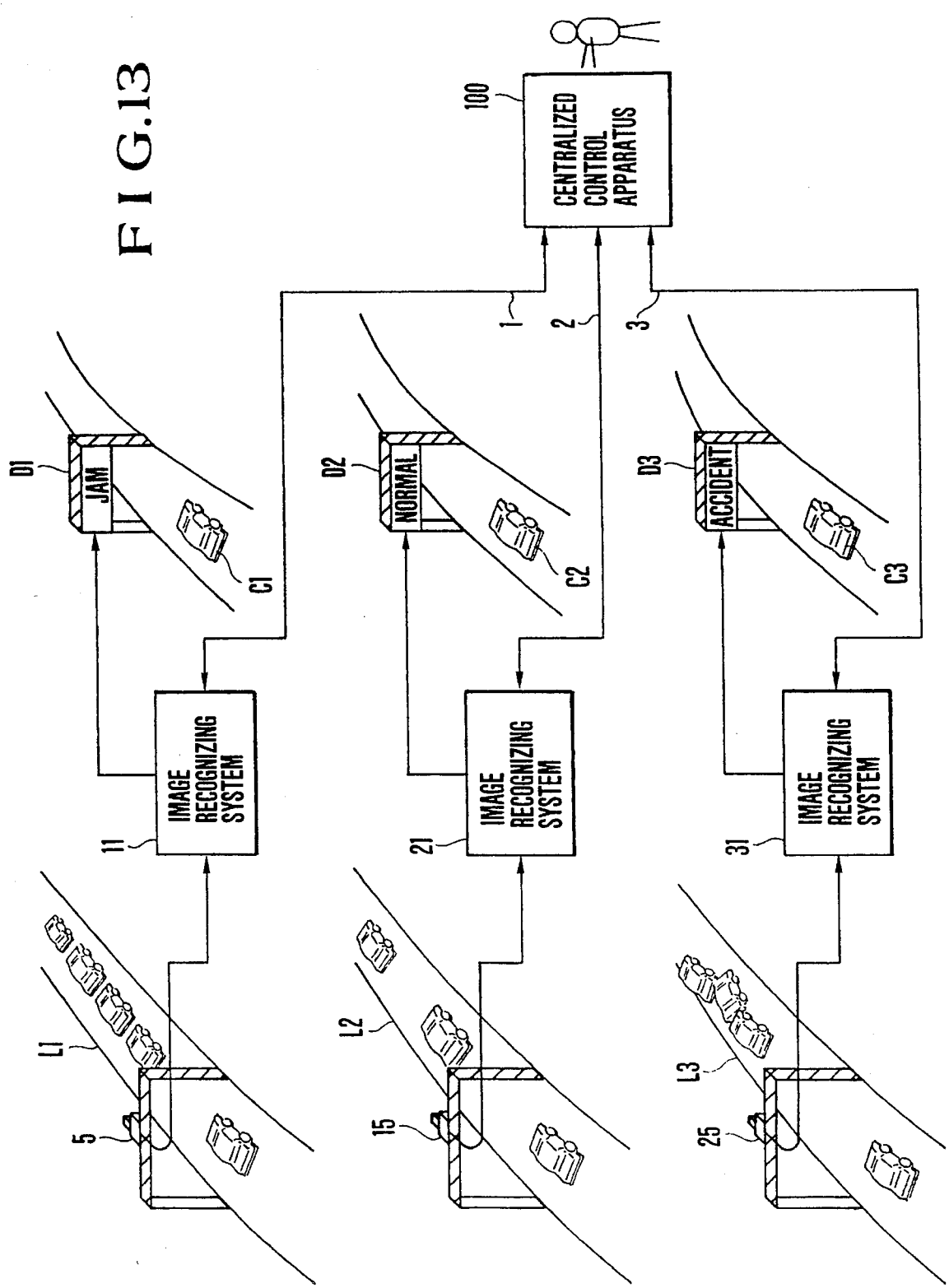
FIG. 13 is a constructional diagram of a traffic flow instrumentation system in a fifth embodiment of the invention.

A fifth embodiment of the present invention will now be described. The fifth embodiment relates to an embodiment where the distributed image recognizing system described in the first embodiment is applied to a traffic flow instrumentation system as one of the general industrial fields.
(a) Construction Constructional elements as main components in fifth embodiment will now be described below with reference to FIG. 13.

i) The image recognizing systems 11, 21, and 31 measure traffic flow on a road. Their fundamental constructions are similar to those mentioned in the first embodiment.

ii) The centralized control apparatus 100 executes the formation of the necessary tuning parameters for the traffic flow measuring processes of the image recognizing systems 11, 21, and 31, activation of each image recognizing system, and the like. The centralized control apparatus' fundamental construction is similar to that in the first embodiment.

iii) Road information display apparatuses $D_1$, $D_2$, and $D_3$ provide various road information such as traffic jam, accident, and the like to drivers of vehicles operating on the road.

iv) The transmission lines 1, 2, and 3 are used to transmit and receive large capacity data such as image data or the like at a high speed between the centralized control apparatus 100 and the image recognizing systems 11, 21, and 31.
(b) Operation As shown in FIG. 13, in the traffic flow instrumentation system of this embodiment, the traffic flows on roads $L_1$, $L_2$, and $L_3$ located at three remote positions are measured by the respectively arranged image recognizing systems 11, 21, and 31. The results are sent to the road information display apparatuses $D_1$, $D_2$, and $D_3$ installed for the roads. On the basis of the results, the road information display apparatuses $D_1$, $D_2$, and $D_3$ inform the road traffic information to drivers $C_1$, $C_2$ and $C_3$ of the vehicles operating on the roads.

The practical operation of the embodiment will now be described hereinbelow with reference to FIG. 13.

First, in the off-line, an operator performs the execution controls of the image recognizing systems 11, 21, and 31 by the operation of the centralized control apparatus 100. As mentioned in the first embodiment, the execution controls are based on the formation of the tuning parameters necessary for the traffic flow measuring processes of the image recognizing systems 11, 21, and 31.

Practically speaking, i) the image obtained by photographing the road by the ITV 5 is fetched by the image recognizing system 11. The previous image is processed by using the image processing function so that the tuning parameters can be easily formed at the centralized control apparatus 100. As a process executed in this case, a process to emphasize the road surface edge portion by outline emphasis or the like is performed.

ii) The image recognizing system 11 then transmits the processed image obtained to the centralized control apparatus 100 through the transmission line 1.

iii) The centralized control apparatus 100 forms various tuning parameters or the like from the image which has just been transmitted on the basis of the instructions from the operator. For instance, the control apparatus 100 forms such tuning parameters as the measuring area image (already described in the second embodiment) to limit a measuring region on the image, parameters for correspondence of the distances between the roads and the images, standard vehicle width and length to discriminate the vehicle, a threshold value for binarization to extract the vehicle, and the like.

iv) The tuning parameters formed in the item iii) are transmitted to the image recognizing apparatus 11 via the transmission line 1.

v) When the tuning parameters are received, the image recognizing system 11 goes on-line and starts the traffic flow measuring processes on the basis of those parameters.

vi) The image recognizing system 11 transmits the result of the traffic flow instrumentation to the road information display apparatus $D_1$ at a predetermined time interval.

vii) On the basis of the result of the item vi), the road information display apparatus $D_1$ displays the traffic information of the road. For instance, in the example of FIG. 13, it displays a message of the traffic jam, thereby informing the situation of the road at the forward position to a subsequent driver (of a vehicle which runs along the road toward the position presently being measured). viii) The processes similar to those in the items i) to vii) are also executed in the image recognizing systems 21 and 31.
(c) Effects In addition to the effects of the first embodiment, the fifth embodiment permits the execution of the measuring processes of the traffic flows on a plurality of remotely distributed roads by a small number of operators in a short time since the distributed image recognizing system of the invention can be applied to the traffic flow instrumentation system.

(6) Embodiment 6

Figure 14:
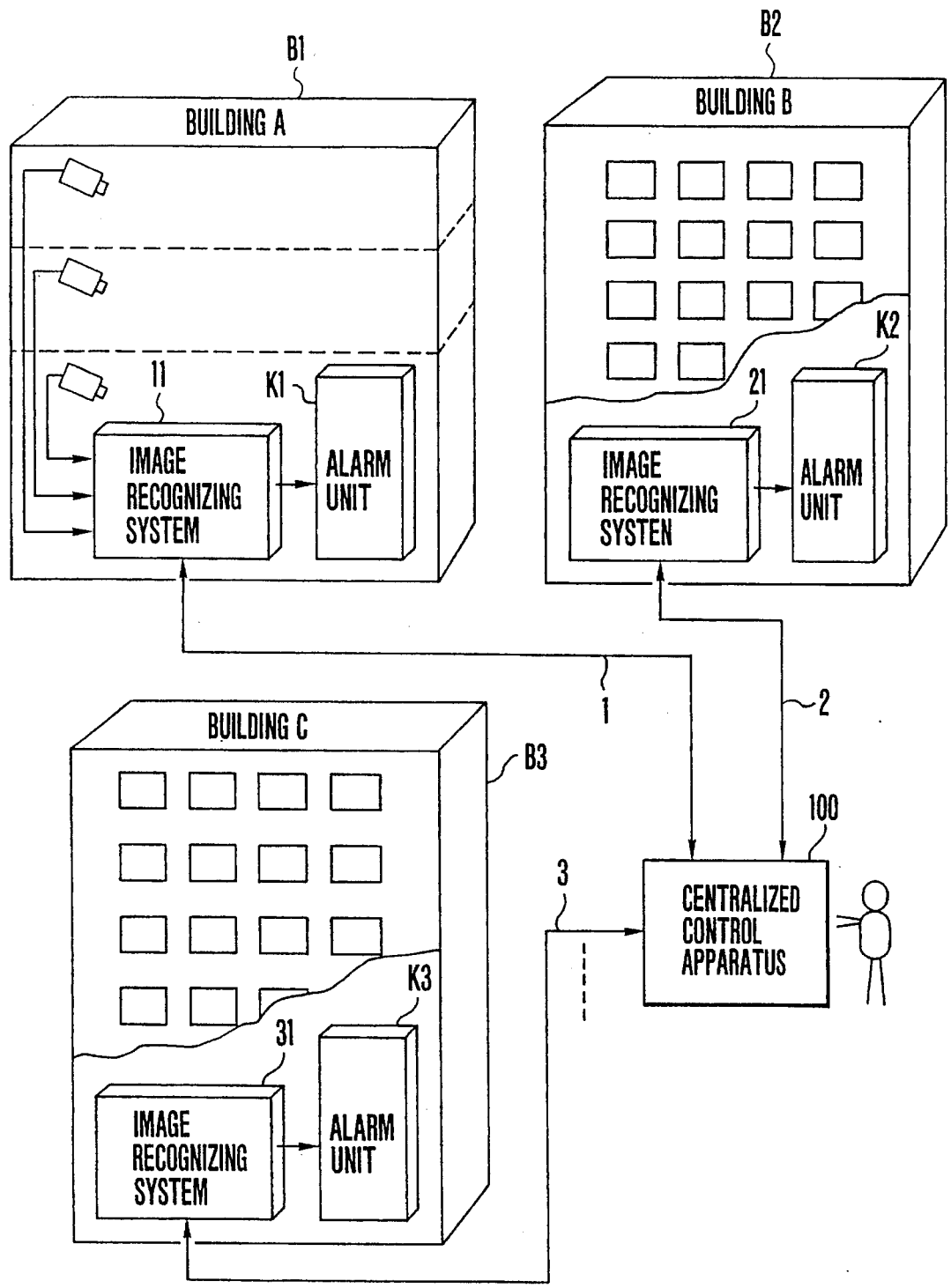
FIG. 14 is a constructional diagram of a crime/disaster preventing system in buildings in a sixth embodiment of the invention.

A sixth embodiment of the present invention will be described below. The sixth embodiment relates to an embodiment where the distributed image recognizing system described in the first embodiment is applied to a system to prevent crimes and disasters in buildings as a potential general industrial field for use.
(a) Construction Constructional elements as main components of the sixth embodiment will now be described hereinbelow with reference to FIG. 14.

i) The image recognizing systems 11, 21, and 31 detect abnormalities, such as illegal invaders, smoke, occurrence of fire, and the like, in buildings (or at other remote locations) by image processing. The fundamental construction is similar to that mentioned in the first embodiment.

ii) The centralized control apparatus 100 executes the formation of the tuning parameters necessary for processes to detect abnormalities in the buildings by the image recognizing systems 11, 21, and 31, the activation of each image recognizing system, and the like. The fundamental construction is the same as that in the first embodiment.

iii) The transmission lines 1, 2, and 3 are provided to transmit and receive large capacity data such as image data and the like at a high speed between the centralized control apparatus 100 and the image recognizing systems 11, 21, and 31.

iv) Alarm units $K_1$, $K_2$, and $K_3$ generate alarms on the basis of abnormality detection commands from the image recognizing systems 11, 21, and 31.
(b) Operation As shown in FIG. 14, in the system for monitoring and preventing crimes and disasters in buildings according to this embodiment, the image recognizing systems 11, 21, and 31 are arranged in buildings $B_1$, $B_2$, and $B_3$ located at three remote positions. Abnormalities such as persons who illegally enter the buildings, smoke, occurrence of fire, and the like are detected by the image recognizing systems, and the results of the detection of the abnormalities are transmitted to the alarm units $K_1$, $K_2$, and $K_3$ attached in the buildings, thereby controlling the generation of alarm of each alarm unit.

The practical operation of the sixth embodiment will now be described hereinbelow with reference to FIG. 14.

First, in the off-line state, one operator performs the execution controls of the image recognizing systems 11, 21, and 31 by the operation of the centralized control apparatus 100. As mentioned in the first embodiment, the execution controls are based on the formation of the tuning parameters necessary for the processes to detect abnormalities in the buildings by the image recognizing systems 11, 21, and 31.

Practically speaking, i) the image recognizing system 11 fetches the image at the position to be measured by the ITV. The image is processed by using the image processing function so that the tuning parameters can be easily formed by the centralized control apparatus 100. In this case, there is executed a process to eliminate subjects which might trigger a false, for instance, animal body noise or the like which is included in the image. The above image is also used as a reference image (a normal state image used to detect an abnormality by the difference with the image in the normal state) in the abnormality detecting process in the subsequent on-line.

ii) In the image recognizing system 11, the image obtained in the item i) is transmitted to the centralized control apparatus 100 via the transmission line 1.

iii) The centralized control apparatus 100 forms various tuning parameters or the like from the just transmitted image on the basis of the instructions of the operator. For instance, the control apparatus 100 executes the formation of a measuring area image (described in the second embodiment) to limit a measuring area on the image, discrimination to see if the previous image is optimum as a reference image or not, and the like. If the image is improper (an extraordinary subject mixedly exists), the centralized control apparatus 100 processes the image by the data processing section and forms an optimum reference image.

iv) The tuning parameters and the like formed in the item iii) are transmitted to the image recognizing system 11 via the transmission line 1.

v) When the tuning parameters are received, the image recognizing system 11 goes on-line and starts the abnormality detecting process on the basis of those parameters.

vi) When an abnormality is detected, the image recognizing system 11 outputs an alarm generation command to the alarm unit $K_1$.

vii) Processes similar to those in the items i) to vi) are also executed in the image recognizing systems 21 and 31.

(c) Effects

In addition to the effects of the first embodiment, the sixth embodiment permits the execution of the processes to monitor and prevent crimes and disasters in a plurality of distributed buildings by a small number of operators in a short time, since the distributed image recognizing system of the invention can be applied to the system for monitoring and preventing crimes and disasters in buildings.

(7) Embodiment 7

A seventh embodiment of the present invention will now be described below. The seventh embodiment relates to an embodiment in the case where the distributed image recognizing system described in the first embodiment is applied to a large scale FA (Full Automation) system as one of the general industrial fields.

The large scale FA system which is used here intends to realize the full automation in a factory and is for instance, an integrated automated system for product manufacturing by assembly of parts, outside appearance inspection outside appearance such as scratches, fouling, and the like of the final products, product conveyance, and the like.

(a) Construction

The fundamental elements as main components of the seventh embodiment will now be described hereinbelow with reference to FIG. 15.

i) The image recognizing systems 11, 21, and 31 execute controls for such operations as assembly, inspection, conveyance, and the like of products by image processes. The fundamental construction is similar to that mentioned in the first embodiment.

ii) The centralized control apparatus 100 executes the turning parameter formation for the image recognizing systems 11, 21, and 31, each image recognizing system's activation, and the like. The fundamental construction is similar to that in the first embodiment.

iii) The transmission lines 1, 2, and 3 are provided to transmit and receive large capacity data such as image data and the like at a high speed between the centralized control apparatus 100 and the image recognizing systems 11, 21, and 31.

iv) An assembling robot $R_1$ is a handling robot for executing the attachment, insertion, and the like of parts.

v) Gate switches $R_2$ and $R_3$ are apparatuses to switch the destination direction of the products transported by belt conveyors or the like.

vi) Belt conveyors $T_1$, $T_2$, and $T_3$ convey the parts, final products, and the like in the manufacturing steps.

(b) Operation

Figure 15:
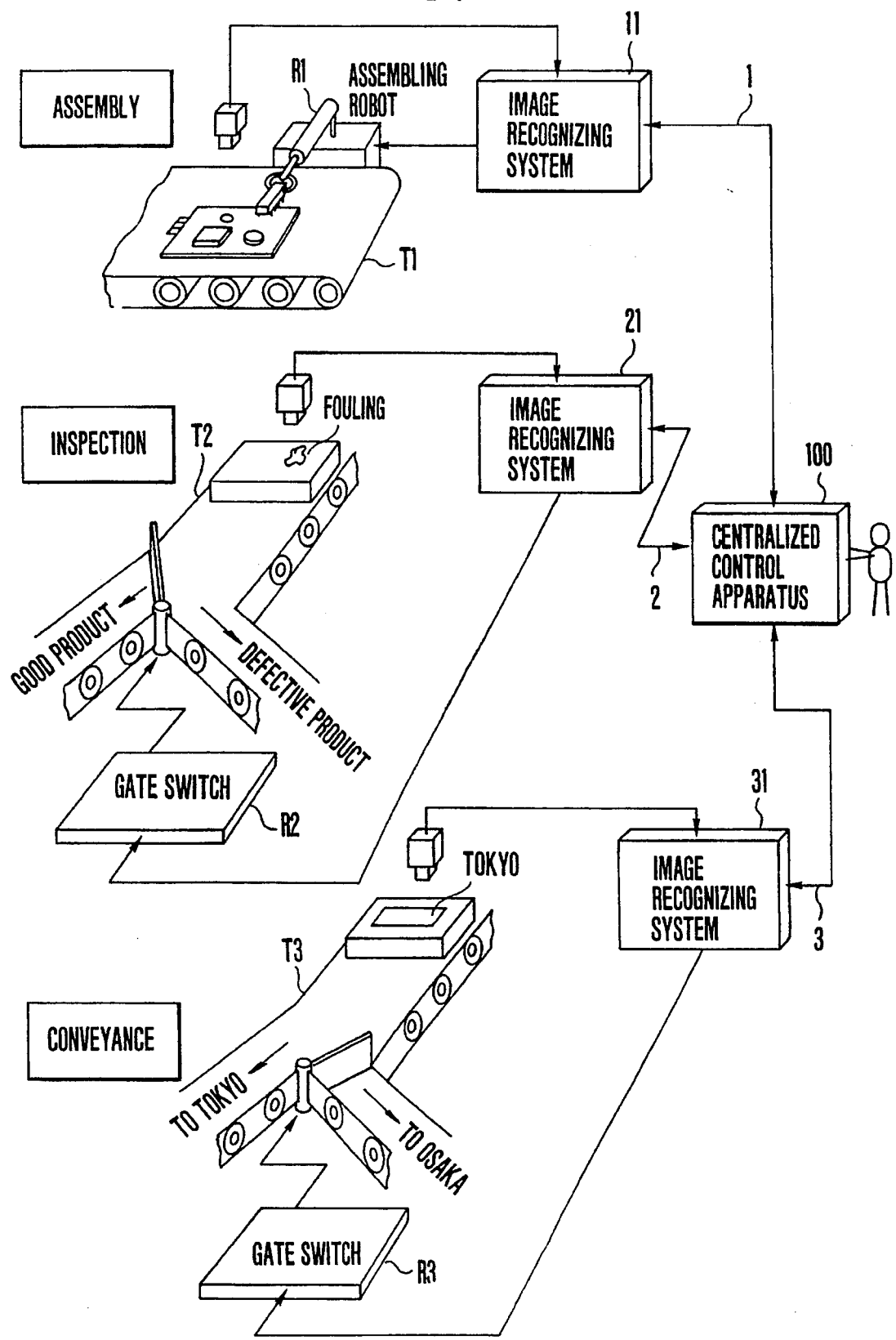
FIG. 15 is a constructional diagram of a large scale FA system in a seventh embodiment of the invention.

As shown in FIG. 15, according to the large scale FA system of the embodiment, the assembling robot $R_1$ and gate switches $R_2$ and $R_3$ are made operative in response to control commands from the image recognizing systems 11, 21, and 31 assigned in conformity with objects such as assembly, inspection, conveyance, and the like of the product, thereby realizing full automation in the factories.

The practical operation of the embodiment will now be described hereinbelow with reference to FIG. 15.

First, in the off-line state, one operator performs the execution controls of the image recognizing systems 11, 21, and 31 as mentioned in the first embodiment by the operation of the centralized control apparatus 100.

The image recognizing system 11 controls product assembly. The image recognizing system 21 controls outside appearance inspection such as scratches, fouling, or the like of the products. The image recognizing system 31 controls final product conveyance. The execution controls of the image recognizing systems by the centralized control apparatus 100 will be described hereinbelow.

i) In the assembling process, in the off-line state, the centralized control apparatus 100 sets the attaching and inserting positions of the parts and the like to be detected from the image received from an image recognizing system 11 and transmits position information to the image recognizing system 11 via the transmission line 1.

In the on-line state, the image recognizing system 11 recognizes the attaching and inserting positions and the like of the parts on the basis of the image derived from the ITV and the position information instructed in the off-line state from the centralized control apparatus 100 and sends the results of the recognition to the assembling robot $R_1$. On the basis of the position information, the assembling robot $R_1$ executes the attaching operation, inserting operation, and the like of the parts and assembles the products.

ii) In the inspection of work, the centralized control apparatus 100 collects sample images of scratches and fouling formed on the products from the images of the products received from the image recognizing system 21 and transmits the samples to the image recognizing system 21 via the transmission line 2 in the off-line state.

In the on-line state, the image recognizing system 21 detects the scratches and fouling of the products on the basis of the images derived from the ITV and the sample images of scratches and fouling indicated in the off-line state from the centralized control apparatus 100 and transmits the results of the detection to the gate switch $R_2$. The gate switch $R_2$ controls the destination direction of the products transported on the belt conveyor $T_2$ by discriminating such that if a product has a scratch or fouling, it is regarded as a defective product and if a product is neither scratched nor fouled, it is regarded as a good product.

iii) In the conveying of product, the centralized control apparatus 100 extracts the area (measuring position) of the label portion in which the destination of the product is written from the image received from the image recognizing system 31 and transmits as a measuring area image (as in the second embodiment) to the image recognizing system 31 via the transmission line 3 in the off-line state.

In the on-line state, the image recognizing system 31 extracts the area of the label portion in which the destination of the product is written from the image fetched from the ITV on the basis of the measuring area image formed by the centralized control apparatus 100. Further, the system 31 recognizes the characters written in the area and sends the result of the recognition to the gate switch $R_3$. The gate switch $R_3$ controls the destination of the product transported on the belt conveyor $T_3$ from the result of the recognition of the destination. In the embodiment, the destination is switched between Tokyo and Osaka.

(c) Effects

In addition to the effects in the first embodiment, the seventh embodiment permits the integrated automatization of assembly, inspection, conveyance, and the like of the products in factories to be realized by a small number of operators in a short time, since the distributed image recognizing system of the invention can be applied to the large scale FA system.

(8) Embodiment 8

An eighth embodiment of the present invention will be described below. According to the eighth embodiment, both the non-processed image (original image) of the ITV and the processed image obtained after the original image is processed are transmitted from the image recognizing system to the centralized control apparatus via the transmission line. The centralized control apparatus multiplexes the original image and the processed image and displays the multiplexed image by the monitor, thereby enabling the operator to visually monitor the operating states of the distributed and arranged image recognizing systems.

(a) Construction

Figure 16:
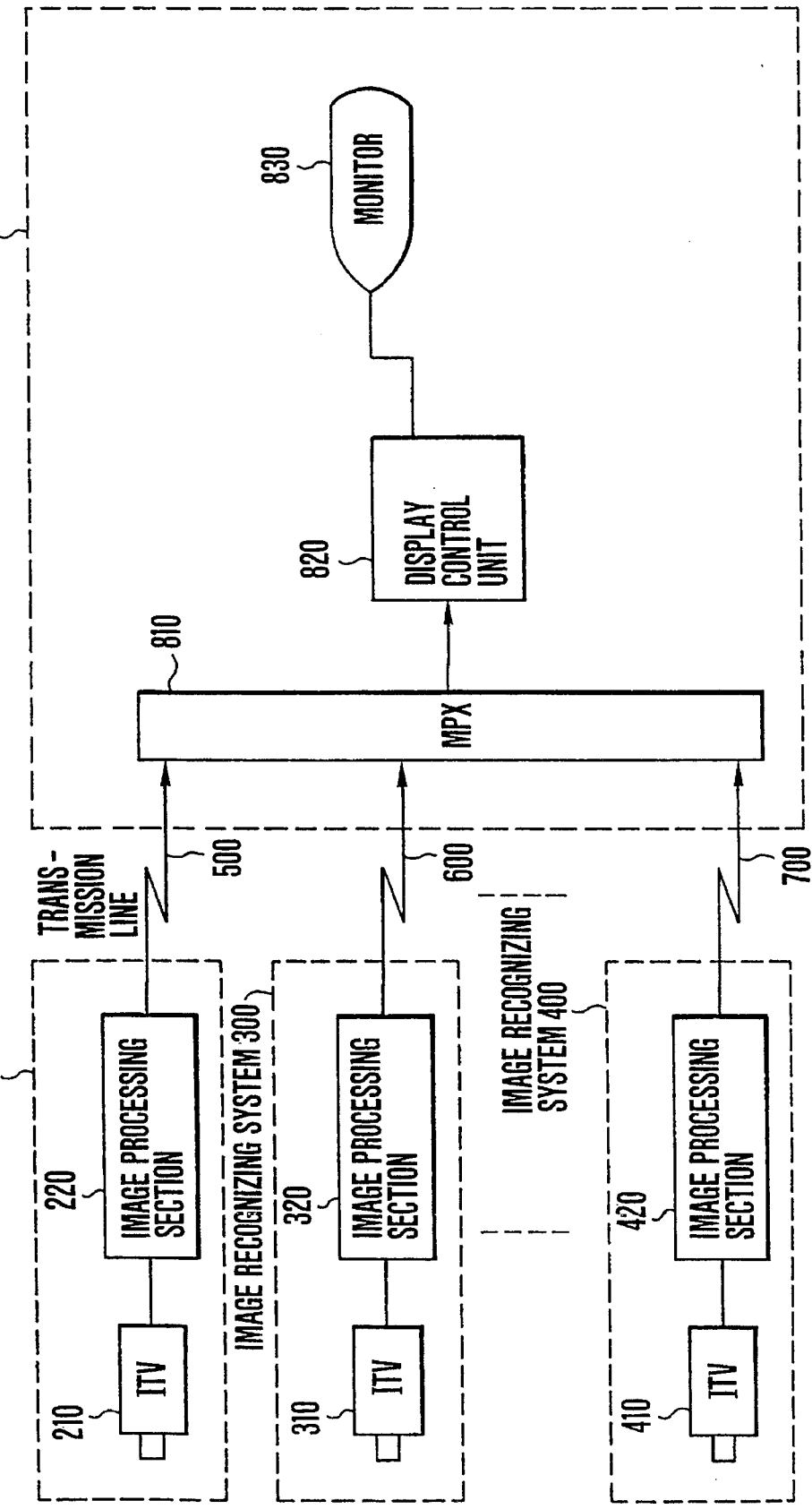
FIG. 16 is a fundamental constructional view of the eighth embodiment of the invention.

A construction of the embodiment will be described with reference to FIG. 16.

i) An image recognizing system 200 comprises an ITV 210 and an image processing section 220. The image processing section 220 executes processes such as image recognition, measurement, monitoring, and the like with respect to the image photographed by the ITV 210 by using the image processing function. The same shall also apply to image recognizing systems 300 and 400.

ii) A transmission line 500 is provided to simultaneously transmit the inherent image (original image) of the ITV 210 which is sent from the image recognizing system 200 and the processed image which is obtained after the original image is processed by the image processing section 220 to a centralized control apparatus 800. The same shall also apply to transmission lines 600 and 700.

iii) The centralized control apparatus 800 comprises: a multiplexer MPX 810 to select one of the transmission lines 500, 600, and 700; a display control unit 820 for multiplexing at a video signal level the original images from the image recognizing systems 200, 300, and 400 and the processed images which are sent via the transmission lines 500, 600, and 700; and a monitor 830 to display the multiplexed video signal from the display control unit 820.

(b) Operation

The operation of the embodiment will now be described with reference to FIGS. 17 and 18. The eighth embodiment relates to an embodiment where the distributed image recognizing system of the invention is applied to the traffic flow instrumentation system previously explained in the fifth embodiment.

In the on-line measurement, the image recognizing systems 200, 300, and 400 measure the traffic flows on the roads to be measured. At the same time, the original images photographed by the ITVs and the processed images obtained after the original images are processed by the image processing sections are transmitted from the image recognizing systems 200 to 400 to the centralized control apparatus 800 via the corresponding transmission lines 500 to 700. The centralized control apparatus 800 selects one of the transmission lines 500 to 700 by the MPX 810 and receives the transmitted original images and processed images by the display control unit 820. The display control unit 820 multiplexes the original images and processed images and forms a multiplexed video signal. The monitor 830 displays the multiplexed video signal on the screen.

When selecting the transmission lines 500 to 700 by the MPX 810, for instance, one of the lines is selected at every predetermined period and all of the transmission lines are uniformly selected. The operator working at the position of the centralized control apparatus 800 observes the content on the screen displayed by the monitor 830 and monitors the operations of the image recognizing systems 200 to 400.

FIG. 17 shows an example in which a measuring area image (the same image as that in the second embodiment) is used as a processed image and the operator can visually monitor whether the ITV installed at the measuring location has been deviated from a target or not. That is, the original image (FIG. 17(a)) from the ITV and the measuring area image (FIG. 17(b)) are transmitted from the image recognizing system to the centralized control apparatus via the transmission line. The centralized control apparatus multiplexes the two transmitted images and displays multiplexed images as shown in FIGS. 17(c) and 17(d) on the monitor. At this time, FIG. 17(c) shows the image in the normal case where the ITV has not deviated in position since the measuring area was set. That is, the measuring area image generated by the image recognizing system is accurately multiplexed at the road surface position on the original image of the ITV. On the other hand, FIG. 17(d) shows an example of the image where the ITV was deviated to the right from a target. The deviation of the ITV can be detected because the area (measuring area image) presently being measured by the image recognizing system is deviated from the original image as shown in the diagram.

FIG. 18 shows an example in which a recognition resultant image of a vehicle is used as a processed image and the operator can visually monitor whether the image recognizing system normally recognizes the vehicle or not. That is, the original image (FIG. 18(a)) from the ITV and the vehicle recognition resultant image (FIG. 18(b)) are transmitted from the image recognizing system to the centralized control apparatus via the transmission line. The centralized control apparatus multiplexes the two transmitted images and displays a multiplexed image as shown in FIG. 18 on the monitor. The recognition resultant image (FIG. 18(b)) of the vehicle as a processed image at this time is obtained in the following manner. The image recognizing system processes the original image and for an object determined to be a vehicle as the result of the image process, for instance, a rectangular image which surrounds the object is generated. In addition to the rectangular image, various images such as a circular image, a binary image of a vehicle, and the like can be considered as such a recognition resultant image.

By multiplexing the recognition resultant image and the original image as shown in FIG. 18(c), the operator can confirm in a real-time manner whether the vehicle displayed on the original image could be recognized by the image recognizing system or not.

On the other hand, if both of the measuring area image in FIG. 17(b) and the recognition resultant image of a vehicle in FIG. 18(b) are used as processed images, the checking operations of both of the deviation of the ITV and the recognition can be simultaneously realized. By variously selecting the processed images in accordance with the object to monitor, the burden of the monitoring by the operator can be reduced.

(c) Effects

The embodiment has the following effects.

i) The deviation of the ITV can be detected.

When the ITV was deviated from a target position due to an influence by the vibration of the road surface, wind, rain, or the like, the operator can visually detect such a deviation.

ii) The operation state of the image recognizing system can be visually confirmed.

The operator can check in a real-time manner whether the image recognizing system can correctly recognize an object to be measured or not, so that the operating state of the image recognizing system can be easily monitored.

What is claimed is:

1. A distributed image processing system comprising:
 a plurality of distributed image recognizing systems, each including:
  a camera to produce an image,
  means for processing said image according to a predetermined processing procedure, thereby generating a processed image for measuring of a given event based on said processed image, and
  means for transmitting image data relating to one of said produced image and said processed image to a transmission line; and
 a centralized control apparatus connected to each of said image recognizing systems through said transmission line, to control said image recognizing systems, said centralized control apparatus comprising:
  means for selecting one of said plurality of image recognizing systems according to a selection signal,
  means for receiving and displaying on a monitor the image data transmitted from said selected recognizing system,
  means for processing the received image data thereby generating a process data required for said one of said image recognizing systems, and
  means for transmitting said process data to said selected image recognizing system to execute a measurement of the given event upon receiving the transmitted process data;
 wherein said centralized control apparatus includes means for storing knowledge used for executing said processing procedure by each of said plurality of image recognizing systems and means for transmitting said knowledge in response to a request from said one of the image recognizing systems requesting said knowledge.

2. A system according to claim 1, wherein said knowledge includes knowledge regarding at least one of the following: a situation of shadow which appears in the image of the subject; a past record of recognition of the event by each of the image recognizing systems; and a past record of the turning parameters produced by said centralized control apparatus.

3. A distributed image recognizing system comprising:
 a plurality of transmission lines;
 a plurality of image recognizing units, each including,
  image input means for inputting an image,
  processing means for processing the input image based on received process data to produce a processed image, and
  transmitting means for transmitting at least one of the input image and the processed image to a respective one of said plurality of transmission lines; and
 a centralized control apparatus connected to said plurality of image recognizing units through said plurality of transmission lines, respectively, said centralized control apparatus comprising,
  storing means for storing at least one of said input image and the processed image transmitted from one of said image recognizing units through the respective transmission line,
  an image processor for processing said at least one of said input image and the processed image stored in said storing means according to a predetermined procedure to generate process data to be used by said processing means of said one image recognizing unit when processing the input image,
  display means having a display screen for displaying said at least one of said input image and the processed image stored in said storing means on said display screen, and
  supplying means for supplying said process data generated by said image processor to said processing means of said one image recognizing unit as said received process data.

4. A distributed image recognizing system according to claim 3, wherein said process data represents a given event to be measured in a specified region in said at least one of said input image and the processed image transmitted from said one image recognizing unit.

5. A distributed image recognizing system comprising:
 a plurality of transmission lines;
 a plurality of image recognizing units, each including,
  image input means for inputting an image,
  processing means for processing the input image based on received process data to produce a processed image, and transmitting means for transmitting at least one of the input image and the processed image to a respective one of said plurality of transmission lines; and a centralized control apparatus connected to said plurality of image recognizing units through said plurality of transmission lines, respectively, said centralized control apparatus comprising, storing means for storing at least one of said input image and the processed image transmitted from one of said image recognizing units through the respective transmission line, an image processor processing said at least one of said input image and the processed image stored in said storing means according to a predetermined procedure to generate process data, display means having a display screen for displaying said at least one of said input image and the processed image stored in said storing means on said display screen, supplying means for supplying said process data generated by said image processor to said processing means of said one image recognizing unit as said received process data, input means for inputting a test image, processing means for processing said input test image according to a predetermined procedure, thereby generating a processed test image, and transmitting means for transmitting said input test image to at least one of said plurality of image recognizing units, wherein said transmitted test image is processed in said at least one of said plurality of image recognizing units according to substantially a same procedure as a procedure according to which said input test image is processed by said processing means of said centralized control apparatus, and wherein the processed test image is returned from said at least one of said plurality of image recognizing units to said centralized control apparatus, and means for comparing said processed test image generated by said processing means of said centralized control apparatus with the processed test image returned from said at least one of said plurality of image recognizing units, thereby judging whether a failure exists in said at least one of said image recognizing units.

* * * * *